US007643469B2

(12) United States Patent  
Alicherry et al.

(10) Patent No.: US 7,643,469 B2
(45) Date of Patent: Jan. 5, 2010

(54) METHOD FOR CHANNEL ASSIGNMENT AND ROUTING FOR MULTI-RADIO WIRELESS MESH NETWORKS

(75) Inventors: Mansoor Ali Khan Alicherry, Scotch Plains, NJ (US); Randeep S. Bhatia, Somerset, NJ (US); Li Li, Edison, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 694 days.

(21) Appl. No.: 11/325,060

(22) Filed: Jan. 4, 2006

(65) Prior Publication Data

US 2007/0153702 A1     Jul. 5, 2007

(51) Int. Cl.
*H04L 12/28* (2006.01)

(52) U.S. Cl. .................................. 370/351; 370/254

(58) Field of Classification Search ................ 370/235, 370/252, 254, 351, 356
See application file for complete search history.

(56) References Cited

U.S. PATENT DOCUMENTS

| 6,480,497 | B1* | 11/2002 | Flammer et al. ............. 370/400 |
| 2004/0008663 | A1* | 1/2004 | Srikrishna et al. ........... 370/351 |
| 2005/0075104 | A1* | 4/2005 | Jain et al. .................... 455/423 |
| 2005/0129005 | A1* | 6/2005 | Srikrishna et al. ........... 370/356 |
| 2007/0147208 | A1* | 6/2007 | Watabe ..................... 369/53.31 |

OTHER PUBLICATIONS

Kodialam et al., "Characterizing the Capacity Region in Multi-Radior Multi-Channel Wireless Mesh Networks", Aug. 28-Sep. 2, 2005, Copyright 2005, MobiCom '05, Cologne, Germany, pp. 73-87.*

Bejerano, Y., "Efficient Integration of Multi-hop Wireless and Wired Networks with QoS Constraints," in *Proc. MOBICOM*, pp. 215-226, Sep. 23-28, 2002.

Bhatia, R., et al., "On Power Efficient Communication over Multi-hop Wireless Networks: Joint Routing, Scheduling and Power Control," in *Proc. IEEE Infocom*, pp. 1457-1466, 2004.

Akyildiz, I.F., et al., "Wireless mesh networks: a survey," *Computer Networks Journal*, pp. 1-43, , Elsevier, 2005.

Gupta, P., et al., "The Capacity of Wireless Networks," *IEEE Transactions on Information Theory*, IT-46(2):388-404, Mar. 2000.

Kyasanur, P., et al., "Capacity of Multi-Channel Wireless Networks: Impact of Number of Channels and Interfaces," in *Proc. ACM MOBICOM*, 2005.

Raniwala, A., et al., "Architecture and Algorithms for an IEEE 802.11-Based Multi-Channel Wireless Mesh Network," in *Proc. IEEE INFOCOM*, 2005.

(Continued)

*Primary Examiner*—Kwang B Yao
*Assistant Examiner*—Andrew Lai
(74) *Attorney, Agent, or Firm*—Harness, Dickey & Pierce

(57) ABSTRACT

A methodology for making joint channel and routing assignments in multi-radio wireless mesh networks that takes into account interference constraints, the number of channels in a network and the number of radio available at each mesh router, and maximizes bandwidth allocation subject to fairness constraints. In particular, the methodology provides for routing, channel assignment and link scheduling in multi-radio mesh wireless networks utilizing a constant factor approximation technique that models the interference and fairness constraints and is able to account for the number of radios at each of the wireless nodes of a wireless mesh network.

27 Claims, 7 Drawing Sheets

OTHER PUBLICATIONS

Raniwala, A., et al., "Centralized Channel Assignment and Routing Algorithms for Multi-Channel Wireless Mesh Networks," *ACM Mobile Computing and Communications Review (MC2R)*, vol. 8(2), pp. 50-65, 2004.

Bejerano, Y., et al., "Fairness and Load Balancing in Wireless LANs Using Association Control," in *Proc. MOBICOM*, pp. 315-329, 2004.

Draves, R., et al., "Routing in Multi-Radio, Multi-Hop Wireless Mesh Networks," in *Proc. ACM MOBICOM*, pp. 114-128, 2004.

Kumar, V.S.A., "Algorithmic Aspects of Capacity in Wireless Networks," in *Proc. ACM SIGMETRICS*. pp. 133-144, 2005.

Bahl, P., "SSCH: Slotted Seeded Channel Hopping for Capacity Improvement in IEEE 802.11 Ad-Hoc Wireless Networks," in *Proc. ACM MOBICOM*, pp. 216-230, 2004.

Kodialam, M., "Characterizing the Capacity Region in Multi-Radio Multi-Channel Wireless Mesh Networks," in *Proc. ACM MOBICOM*, 2005.

* cited by examiner

EXPERIMENT NUMBER
(a) GRID TOPOLOGIES

RCL ——×——
UPPER BOUND ——○——
WORST CASE BOUND ——□——

EXPERIMENT NUMBER
(b) RANDOM TOPOLOGIES

RCL ——×——
UPPER BOUND ——○——
WORST CASE BOUND ——□——

METHOD FOR CHANNEL ASSIGNMENT AND ROUTING FOR MULTI-RADIO WIRELESS MESH NETWORKS

STATEMENT REGARDING FEDERALLY SPONSORED RESEARCH OR DEVELOPMENT

This invention was made with U.S. Government support under Agreement No. ANI-0335244 awarded by the National Science Foundation. The U.S. Government has certain rights in the invention.

FIELD OF THE INVENTION

The present invention relates generally to wireless broadband networks and, more specifically, to channel assignment and routing for throughput optimization in an infrastructure wireless mesh network (IWMN) having multiple radios.

BACKGROUND OF INVENTION

Wireless broadband networks are being increasingly deployed in a multi-hop wireless mesh network (WMN) configuration. Currently, one application for WMNs is for extending or enhancing Internet connectivity for mobile clients located on the edge of the wired network (the so-called "last mile"). Commercial deployments of WMNs are currently underway in the United States. For example, in Medford, Oreg. and Chaska, Minn. mesh networks have been deployed (see, for example, www.chaska.net), and in Philadelphia, Pa. planning and development of a city-wide mesh network has been announced. One of the significant advantages to the deployment of mesh networks is the delivery of commercial Internet access to residents and local businesses.

In WMNs, the access points (or mesh routers) are rarely mobile and may not have power constraints. In addition these networks operate similarly to wired networks in having infrequent topology changes and limited node failures, for example. Although WMNs may be self-organizing, node additions and maintenance are still rare events. Also, since each mesh router may aggregate traffic flows for a large number of mobile clients, the aggregate traffic load of each mesh router changes infrequently. In IWMNs some mesh routers are also equipped with a gateway capability through which such routers interface with the wired network (see, for example, I. F. Akyildiz et al. "Wireless Mesh Networks: A Survey. *Computer Network Journal* (*Elsevier*), 2005, which is hereby incorporated by reference herein). In such networks traffic is mainly routed by the WMN wireless backbone between the mesh clients and the wired Internet and flows through the gateway nodes. One major problem facing such wireless networks is the capacity reduction due to interference among multiple simultaneous transmissions.

In wireless mesh networks, providing mesh routers with multiple-radios can greatly alleviate this problem in that using multiple-radios, nodes can transmit and receive simultaneously or can transmit on multiple channels simultaneously. However, due to the limited number of channels available, the interference cannot be completely eliminated and careful channel assignment must be done to mitigate the effects of interference. Indeed, several companies such as Mesh Dynamics Inc. (see, www.meshdynamics.com) have announced the availability of multi-radio mesh network products and solutions. In certain multi-radio applications, to make use of well-known IEEE 802.11-based radios, a channel is assigned to a radio interface for an extended period of time as long as traffic demand or network topology does not change.

The study of routing and channel assignments in wireless networks is an area of continued focus. For example, in A. Raniwala et al., "Centralized Channel Assignment and Routing Algorithms for Multi-channel Wireless Mesh Networks, *ACM Mobile Computing and Communications Review*, volume 8(2), pp. 50-65, 2004, which is hereby incorporated by reference herein, an observation was made that assigning channels and radios in a fixed order (i.e., assigning the first channel to the first radio, the second channel to the second radio and so on) will not lead to optimal achievable performance. Further, given that channel assignment and routing are inter-dependent the way in which such assignments are made will also have an impact on performance. This performance impact occurs because channel assignments have an impact on communications link bandwidths and the extent to which link transmissions interfere. This clearly impacts the routing used to satisfy traffic demands in a given network.

In the same way, traffic routing determines the traffic flows for each link thereby also have an affect on channel assignments. In particular, channel assignments need to be done in a way such that the communication requirements for the links can be satisfied. Heuristic approaches on channel assignments and load-aware routing have been proposed to improve the aggregate throughput of WMNs and balance load among gateways (see, e.g., Raniwala et al., supra., and A. Raniwala et al., "Architecture and Algorithms for an IEEE 802.11-based Multi-channel Wireless Mesh Network", In *Proc. IEEE INFOCOM*, 2005, which is hereby incorporated by reference herein). In these approaches, an assumption is made that no system or hardware support is provided which allows for a radio interface to switch channels on a per-packet basis. A centralized joint channel assignment and multi-path algorithm is described in which the channel assignment algorithm considers high load edges first, and the routing algorithm uses both shortest path routing and randomized multi-path routing in an iterative fashion. However, these heuristic approaches will not result in optimal network performance. The system management software can compute the optimal channel assignment (using the aforementioned heuristic approaches) and, using such computed assignments apply routing and configurations to each elements periodically. However, routing protocols will still need to be executed to handle topology changes in the overall network.

However, despite the availability of certain routing and channel assignments it would be desirable to have a way to efficiently make joint channel and routing assignments in multi-radio WMNs that takes into account interference constraints, the number of channels in a network and the number of radio available at each mesh router, and which attempts to maximize the bandwidth allocated subject to fairness constraints.

SUMMARY OF THE INVENTION

Accordingly, we have realized a method making joint channel and routing assignments in multi-radio WMNs that takes into account interference constraints, the number of channels in a network and the number of radio available at each mesh router, and maximizes bandwidth allocation subject to fairness constraints.

More particularly, the various aspects of the present invention are directed to a methodology for the joint routing, channel assignment and link scheduling (hereinafter collectively referred to as the "RCL Methodology"). The RCL Methodology of the present invention provides a constant factor approximation technique for the joint channel assignment, routing and scheduling problem that models the interference and fairness constraints and is able to account for the number of radios at each of the wireless nodes of a WMN. More particularly, the RCL Methodology of the present invention employs at least the following steps:

1. Routing: a given WMN is modeled in terms of a flow graph for a given number of channel. In particular, a linear programming-based approach is utilized for computing the best routing which is optimal in maximizing the network throughput subject to fairness constraints. This results in a flow on the flow graph which may not have a necessarily feasible channel assignment for the node radios. Specifically, a node may be assigned more channels than the number of available radios. However, this channel assignment is "optimal" in terms of ensuring that the interference for each channel is minimum. This step also yields an upper bound on the $\lambda$ value (wherein the $\lambda$ value is the fraction of the aggregate demand that each WMN node can feasibly send to the wired backhaul network) which will be used in establishing a worst case performance guarantee; and 2. Channel Assignment: a channel assignment operation is used to adjust the flow on the flow graph (i.e., routing changes) to ensure a feasible channel assignment. This flow adjustment also strives to keep the increase in interference for each channel to a minimum; and 3. Post Processing: The flow on the flow graph is re-adjusted (i.e., routing changes) to ensure that the maximum interference over all channels is minimized without any change to the actual channel assignment; and 4. Flow Scaling: The flow on the flow graph is scaled to ensure that all interference for all channels is eliminated thereby resulting in a feasible routing and channel assignment which satisfies a sufficient condition for an interference free edge communication schedule; and 5. Interference Free Link Scheduling: for the edge flows corresponding to the flow on the flow graph, an interference free link schedule is generated.

The resultant joint channel assignment and routing, in accordance with the principles of the invention, takes in to account interference constraints, the number of channels in the WMN and the number of radios available at each mesh router while optimizing the overall WMN throughput subject to fairness constraints on allocation of scarce wireless capacity among mobile clients utilizing the WMN.

These and other objects, features and advantages of the present invention will become apparent to those of ordinary skill in the art from the following detailed description of illustrative embodiments thereof, which is to be read in connection with the accompanying drawings.

DETAILED DESCRIPTION OF THE INVENTION

The following description will illustrate the principles of the invention in the context of an exemplary multi-hop infrastructure wireless mesh network. It should be understood, however, that the invention is not necessarily limited to use with any particular type of IWMN, WMN or other mesh network. The principles of the invention are instead more generally applicable to any wireless mesh network utilizing multi-radios for which channel assignment and routing are critical to optimizing throughput in the network.

Further, it is to be understood that the phrase "traffic flow" (or, simply, "flow") generally refers to a group (e.g., two or more) of packets that are to be routed in the network. A "path" in the network generally refers to a set of two or more nodes and one or more links between the nodes. "Nodes" generally refer to elements in the network at least capable of transferring packets. "Links" generally refer to connections between the nodes.

1. System Model

In this section, various basic definitions are introduced, as well as various wireless transmission, interference model, scheduling, routing and fairness principles used in the joint channel and routing principles of the invention as described further hereinbelow.

1.1 System Architecture

Figure 1:
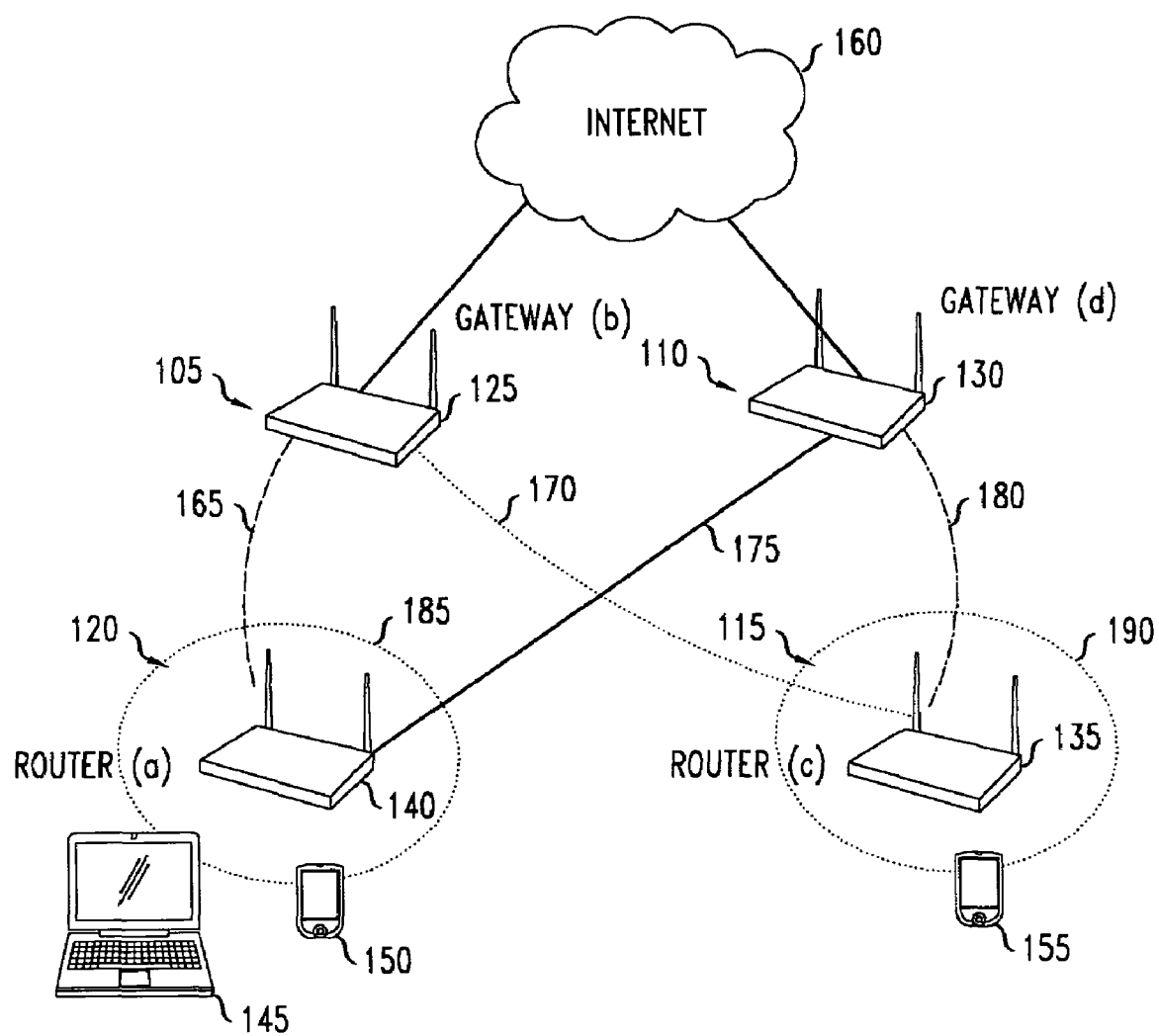
FIG. 1 shows an illustrative multi-hop infrastructure wireless mesh network with four (4) nodes.

The principles of the invention are illustratively directed to multi-hop infrastructure wireless mesh networks. FIG. 1 shows an illustrative multi-hop infrastructure wireless mesh network 100 with four (4) nodes (nodes 105, 110, 115 and 120, respectively). These networks consist of static wireless mesh routers and mobile clients. For example, the illustrative IWMN 100 has gateway router 125 ("gateway (b)") at node 105, gateway router 130 ("gateway (d)") at node 110, router 135 ("router (c)") at node 115 and router 140 ("router (a)") at node 120. The static wireless routers (i.e., router 135 and router 140) are equipped with traffic aggregation capabilities (e.g. access points) and provide network connectivity to mobile clients (e.g., mobile clients 145, 150 and 155) within their coverage areas (e.g., coverage area 185 associated with router 140, and coverage area 190 associated with router 135).

The wireless mesh routers themselves form a multi-hop wireless backbone for relaying the traffic to and from the mobile clients. Some of the wireless mesh routers are equipped with gateway functionality to enable connectivity to the wired Internet, in particular, gateway router 125 and 130. All infrastructure resources that the mobile client access (e.g. web servers, enterprise servers, Internet gateways) reside on the wired Internet 160 and can be accessed via any wireless mesh router with gateway functionality. Thus, the wireless backbone of mesh routers mainly relays the traffic of the mobile clients to and from the Internet via the routers with gateway functionality. Each wireless mesh router may be equipped with multiple wireless interfaces (i.e., radios) each operating on a particular channel. For example, the four nodes (i.e., nodes 105, 110, 115 and 120, respectively) shown in FIG. 1 each have two interfaces each operating on different channels. These channels are illustratively shown in FIG. 1 as edge labels 165, 170, 175 and 180, respectively.

We model the backbone of an infrastructure WMN as a directed graph G=(V, E). Except for one node t representing the wired network, the nodes of the graph correspond to individual wireless mesh routers and for each such node u ∈ V a value I(u) denotes the number of wireless interfaces that it has. Among the nodes in V some of the nodes have gateway functionality and provide connectivity to the wired Internet (represented by node t) using high capacity bidirectional links. We denote these nodes by the set $V_G \subseteq V$. A wireless interface of a mesh router u operates on a single channel selected from the set F. We assume there are K orthogonal channels (throughout this detailed description, a reference to "different channels", means "orthogonal channels" unless the context indicates otherwise) in F numbered from 1 to K. It will be noted that due to the wireless interference constraints there is no capacity advantage in equipping two different interfaces of a node with the same channel. We therefore assume that the interfaces of a node are equipped with distinct channels. Thus, each wireless node u can be associated with an ordered set $F(u) \subseteq F$ of I(u) distinct channels, where the i-th interface of node u operates on the i-th channel in F(u). Each node u in V aggregates the user traffic from all the mesh clients that are associated with u. We denote the aggregate user traffic load on u by l(U). The load l(u) may be due to outgoing or incoming traffic. However, for ease of exposition herein we will assume that there is no incoming traffic to any wireless node from the wired Internet and hence l(u) represents only outgoing traffic. Of course, as will be appreciated by those skilled in the art, the results are extendable (by flow reversal) to the more general case of both outgoing and incoming traffic. We assume l(u) to be a node dependent fixed value which exhibits only long term variability and any such variations can be dealt with by rerouting and readjustment of the channel assignments.

1.2 Wireless Transmission and Interference Model

For direct communication, two nodes need to be within a so-called "communication range" of each other, and need to have a common channel assigned to their interfaces. A pair of nodes that use the same channel and are within a so-called "interference range" and may interfere with each other's communication, even if they cannot directly communicate with each other. Node pairs using different channels can transmit packets simultaneously without interference. For example, in FIG. 1, each node is equipped with 2 network interface cards. As shown in FIG. 1, the links shown between the nodes depict direct communication between them, and the channel used by a pair of nodes is shown as the edge label (i.e., 165, 170, 175 and 180) associated with the connecting link.

We denote by $R_T$ the so-called "transmission range" and by d(u,v) the distance between the nodes u and v. An edge (u, v) ∈ E if and only if $d(u, v) \leq R_T$ and implies that mesh router u can communicate with mesh router v directly (i.e., in one hop). However, such a communication is only possible if there is a common channel among the sets F(u) and F(v). We assume that the channel to radio assignment F(u) for each node u is fixed as long as the traffic demands do not change. In other words, there is no system or hardware support to allow a radio to switch channels on a per-packet basis. We denote by c(e) the rate for edge e=(u,v). This is the maximum rate at which mesh router u can communicate with mesh router v in one hop on a single channel. An edge can support multiple simultaneous communications of rate c(e) each one for every channel in common among the sets F(u) and F(v). Each such communication can be uniquely identified with one channel in common among the sets F(u) and F(v). For notational convenience herein, F(e) is used to denote the common channels between F(u) and F(v). Thus, for an edge e=(u,v), k simultaneous link transmissions each of rate c(e) are possible from node u to node v if there are k channels in F(e).

We denote by $R_I$ the interference range. We assume that $R_I$ is $q \times R_T$ where $q \geq 1$. We assume that in accordance with the IEEE 802.11 media access control protocol, CSMA with RTS (Request to Send)/CTS (Clear to Send)/ACK (Acknowledgement) is used to protect unicast transmissions. Thus, as a result of carrier sensing, a transmission between u and v may block all transmissions within $R_I$ away from either u (due to sensing RTS and DATA) or v (due to sensing CTS and ACK). In particular, simultaneous link transmissions on a common channel f on two distinct edges $e_1=(u_1, v_1)$ and $e_2=(u_2, v_2)$ is possible if and only if none of the four pairs of nodes $(u_1, u_1)$, $(v_1, u_2)$, $(u_1, v_2)$, $(v_1, v_2)$, are at most $R_I$ apart. In such a case it can be said that edges $e_1$ and $e_2$ do not interfere. Otherwise, the two edges interfere with each other. We denote by I (e) ⊆ E the set of edges that interfere with an edge e ∈ E. Note that simultaneous link transmissions on two edges $e_1$ and $e_2$ that interfere is still possible, as long as these transmissions are on distinct channels. It will be noted that the aforementioned interference model is illustrative and the principles of the invention extend to other commonly used interference models including, for example, the protocol model detailed in P. Gupta et al., "The Capacity of Wireless Networks, *IEEE Transactions on Information Theory*, IT-46(2):388-404, March, 2000, which is hereby incorporated by reference, and which is based on certain geometric properties.

1.3 Scheduling, Routing and Fairness

In terms of the methodology herein described, an assumption is made that the system operates synchronously in a time slotted mode. The throughput obtained will provide an upper bound for systems using 802.11 MAC. An assumption is also made that traffic between a node and the gateway nodes is routed on multiple paths to achieve the optimal load balancing and least congestion for the given WMN. This scheme results in a node's traffic to and from the wired network being split over multiple paths, and the end users traffic may still be routed as a whole to the extent possible by performing the traffic split across rather than within user flows. This may be implemented by maintaining user flow information at the end nodes to which the mobile clients connect. Note that load balanced routing is akin to well-known traffic engineering in MPLS networks and results in better network performance. The goal is to maximize the capacity of the network for serving mesh clients. This capacity may not be measured by the total throughput of all mesh clients. Optimizing such a metric may lead to starvation of mesh clients which are far from gateways. As such, fairness constraints need to be considered to prevent such starvation, in particular, we consider the fairness constraint that, for each node u ∈ V, demands are routed in proportion to its aggregate user traffic load l(u). The nodes in V correspond to wireless routers, however, the principles of the invention also apply if V also includes mesh clients.

2. Joint Routing, Channel Assignment Link Scheduling

In this Section, we present an overview of the network throughput optimization challenges, and an overview of the principles of the invention which are directed at resolving throughput optimization issues and, in particular, to our novel RCL Methodology for the joint channel assignment and routing in multi-radio IWMNs.

Formally, we are given a wireless mesh backbone network modeled as a graph (V, E) having a total of K channels. Each node u ∈ V has I(u) network interface cards, and has an aggregated demand l(u) from its associated users. For each edge e the set I(e) ⊂ E denotes the set of edges that it interferes with. We seek to maximize λ where at least λl(u) amount of throughput can be routed from each node u to the Internet (represented by a node t). In order to achieve λl(u) throughput for each node u, one needs to compute:

(1) a network flow that associates with each edge e=(u, v) values f(e(i)), $1 \leq i \leq K$ where f(e(i)) is the rate at which traffic is transmitted by node u for node v on channel I; and (2) a feasible channel assignment F(u) (recall that F(u) is an ordered set where the i-th interface of it operates on the i-th channel in F(u)) such that, whenever f(e(i))>0, $i \in F(u) \cap F(v)$; in this case edge e uses channel i; and (3) a feasible schedule S that decides the set of edge channel pair (e, i) (edge e using channel i) scheduled at time slot τ, for T=1, 2, ..., T where T is the period of the schedule. A schedule is feasible if the edges of no two edge pairs ($e_1$, i), ($e_2$, i) scheduled in the same time slot for a common channel i interfere with each other ($e_1 \notin I(e_2)$ and $e_2 \notin I(e_1)$). The interference free edge scheduling sub-problem given the edge flows is NP-hard.

In view of the foregoing, the present Applicants have realized the principles of the invention directed to a methodology for the joint routing, channel assignment and link scheduling. The RCL Methodology of the present invention provides a constant factor approximation technique for the joint channel assignment, routing and scheduling problem that models the interference and fairness constraints and is able to account for the number of radios at each of the wireless nodes of a WMN. The RCL Methodology establishes the matching necessary and sufficient conditions under which an interference free link communication schedule can be obtained and computed. The RCL Methodology is a novel flow transformation technique that can efficiently assign channels to node radios in a WMN while ensuring that maximum data can be transmitted on specified traffic routes.

More particularly, the RCL Methodology of the present invention performs the following five steps (see also, FIG. 2) in the given order:

1. Routing-Solve LP (see, step 210 of FIG. 2): a given WMN is modeled in terms of a flow graph for a given number of channels. In particular, a linear programming-based approach is utilized for computing the best routing which is optimal in maximizing the network throughput subject to fairness constraints. That is, since the optimal problem with mixed linear and integer program formulation is NP-hard, we first solve the LP relaxation of the problem optimally. This results in a flow on the flow graph which may not have a necessarily feasible channel assignment for the node radios. Specifically, a node may be assigned more channels than the number of its radios. However, this channel assignment is "optimal" in terms of ensuring that the interference for each channel is minimum. This step also yields an upper bound on the λ value which will be used in establishing a worst case performance guarantee; and 2. Channel Assignment (see, step 220 of FIG. 2): a channel assignment algorithm is used to adjust the flow on the flow graph (i.e., routing changes) to ensure a feasible channel assignment. This flow adjustment also strives to keep the increase in interference for each channel to a minimum; and 3. Post Processing (see, step 230 of FIG. 2): the flow on the flow graph is re-adjusted (i.e., routing changes) to ensure that the maximum interference over all channels is minimized without any change to the actual channel assignment; and 4. Flow Scaling (see, step 240 of FIG. 2): the flow on the flow graph is scaled to ensure that all interference for all channels is eliminated thereby resulting in a feasible routing and channel assignment which satisfies a sufficient condition for an interference free edge communication schedule; and 5. Interference Free Link Scheduling (see, step 250 of FIG. 2): for the edge flows corresponding to the flow on the flow graph, an interference free link schedule is generated.

Figure 2:
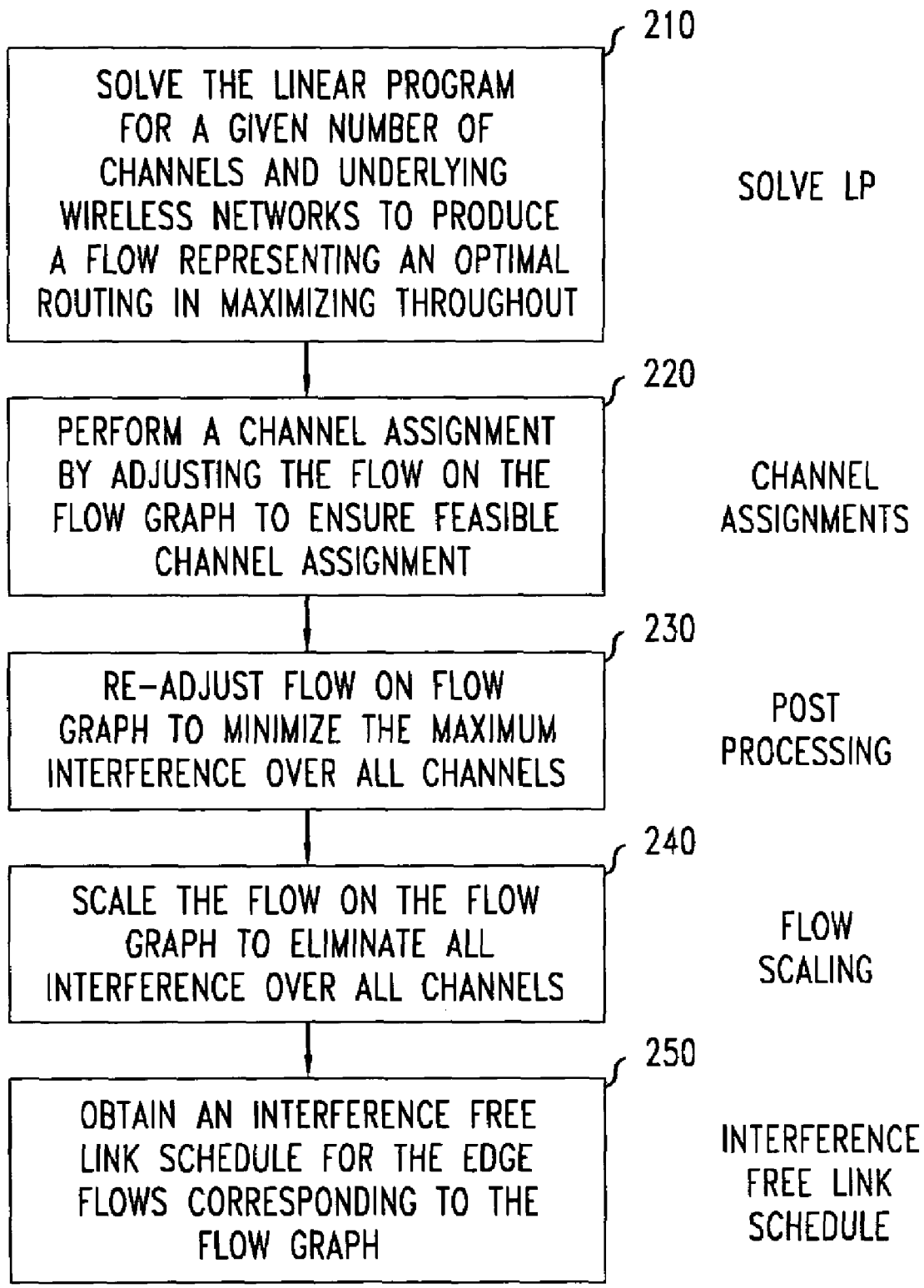
FIG. 2 shows a flowchart of illustrative operations for the joint routing, channel assignment and link scheduling in a multi-hop infrastructure wireless mesh network, in accordance with the principles of the invention.

As referenced above, FIG. 2 shows a flowchart of illustrative operations 200 for the joint routing, channel assignment and link scheduling in a multi-hop infrastructure wireless mesh network, in accordance with the principles of the invention. In the following sections hereinbelow each of the aforementioned steps of the RCL Methodology will be discussed in greater detail.

3. Routing-Solve LP

We first present a mathematical model of the problem in terms of a "flow graph" for the given number of channels K and the underlying wireless network G. Next, a linear programming (LP) based approach for computing the best routing, in accordance with the principles of the invention, which is optimal in maximizing the system throughput subject to fairness constraints. The given routing is also efficient in that the routing satisfies the necessary condition (i.e., the link congestion constraint) that any valid "interference free" edge flows must satisfy.

As mentioned above, the goal is to find a solution that achieves optimal throughput subject to fairness constraints. For ease of exposition we will assume a simple fairness constraint in which the minimum load routed for the nodes in V is maximized. Thus, we are interested in finding a solution that can maximize λ while routing λl(v) aggregate load for each node. Our results are extendable to the more general case: non-uniform node aggregate load and other fairness constraints. For example, to distribute any remaining network capacity after satisfying λl(v) aggregate load the RCL Methodology can be iteratively invoked, thus resulting in efficient utilization of the available resources.

3.1 Network Flows and Flow Graphs for Multiple Channels

The traffic routed between the nodes of the WMN and the gateway nodes can be mathematically described in terms of network flows. For ease of exposition in describing this connection we begin by assuming a single channel and a single radio at each wireless node. Given a traffic routing for the WMN G that is able to satisfy the loads l(v) at all nodes v ∈ V, one can associate with each edge e=(u,v) a value f(e) which is the rate at which traffic is transmitted by node u for node v on the only available channel (for the edges between the gateway nodes and the wired network this traffic goes over wired links).

These f(e) values form the edge flows for a max-flow on a flow graph H constructed as follows: begin with graph G and introduce a source node s and sink node t. Every gateway node v ∈ V has an unlimited capacity directed edge to a designated sink node t ∈ V representing the wired Internet. Node s has a directed edge to every node v∈V of capacity l(v) where l(v) is the outgoing traffic load at node v. We denote these edges by the set $E_s$. The resulting graph is the required flow graph with source node s and sink node t ∈ V. The flow on an edge e ∈ $E_s$ in this flow graph is f(e). Any edge e ∈ $E_s$, in this flow graph has a flow equal to its capacity. Since the traffic routing in G that resulted in the flow values f(e) for the edges of G is able to satisfy the loads l(v) at all nodes v ∈ V, the above defined flow must satisfy flow conservation at every node of G and hence is a valid network flow. Note also that the total flow outgoing from the source node s is equal to the sum of the capacities of the edges outgoing from s. Thus, the resulting flow is a max-flow on the flow graph for the given source and sink nodes.

We now describe the general case when there are multiple channels and multiple radios. We assume there are K orthogonal channels in F, which are numbered 1, 2 . . . K. Given a traffic routing and channel assignment for the WMN G that satisfies the loads l(v) at all nodes v ∈ V, one can associate with each wireless edge e=(u,v) and channel i a value f$^i$(e) which is the rate at which traffic is transmitted by node u for node v on channel i. Note that f$^i$(e)=0 if F(e) does not contain channel i. Note also that when there are multiple channels a packet may be received by a node u on a channel i but may be transmitted by u to a next hop neighbor on a different channel j. Thus, for a wireless node u ∈ V we define f$^{(ij)}$(u) as the rate at which data arriving on channel i at node u leaves it on channel j. Note that f$^{(ij)}$(u)=0 for all channels i and j that are not in F(u).

For each channel i, 1<i<K we create a copy of the flow graph for the single channel case (as described above), except the nodes s and t, and denote it by H(i). For each node v ∈ V and for each edge e ∈ E we denote the corresponding node and edge in H(i) by v(i) and e(i), respectively. We combine these K copies together to create an overall flow graph H and introduce K(K−1)/2 unlimited capacity edges $E_v$ to connect copies of each node v ∈ V:

$$E_v=\{(v(i),v(j)),1\leq i,j\leq K-1, i\neq j, v\in V\}.$$

These edges enable moving flow from one channel to another within a node. We create a super source node s and super sink node t. For every node v ∈ V a dummy source node $s_v$ is introduced along with the edges $E_s$=(s, $s_v$), {($S_v$, v(i)), 1≤i≤K} each of capacity l(v). Intuitively the dummy source node $S_v$, can be thought of doing the splitting of the outgoing traffic for node v for transmission on different channels. We denote the edges terminating on the sink node t by $E_1$. The resulting graph is the required flow graph with source node $S_v$ and sink node t. In this flow graph the flow f (e(i)) on an edge e(i), e ∈ E is set to f$^i$(e), the flow f(s, $s_v$) on edges (s, $s_v$), v ∈ V is set to l(v) and the flow f((v(i),v(j))) on edges in $$E_v=(v(i),v(j)),1\leq i,j\leq K-1, i\neq j, v\in V$$

is set to f$^{(ij)}$(v). The flow f(($s_v$, v(i))) on edges ($s_v$, v(i)), v ∈ V, 1≤i≤K is set to the difference of the total outgoing traffic on channel i on node v and the total incoming traffic on channel i on node v. Likewise, for the gateway nodes v ∈ $V_G$ the flow f((v(i),t)) to the sink node for each channel i is set to the total incoming traffic on channel i on node v that gets sent to the wired gateway by node v. By an argument similar to the one used for the single channel case it can be shown that the resulting flow forms a max flow between the source node s and the sink node t over the flow graph.

Figure 3:
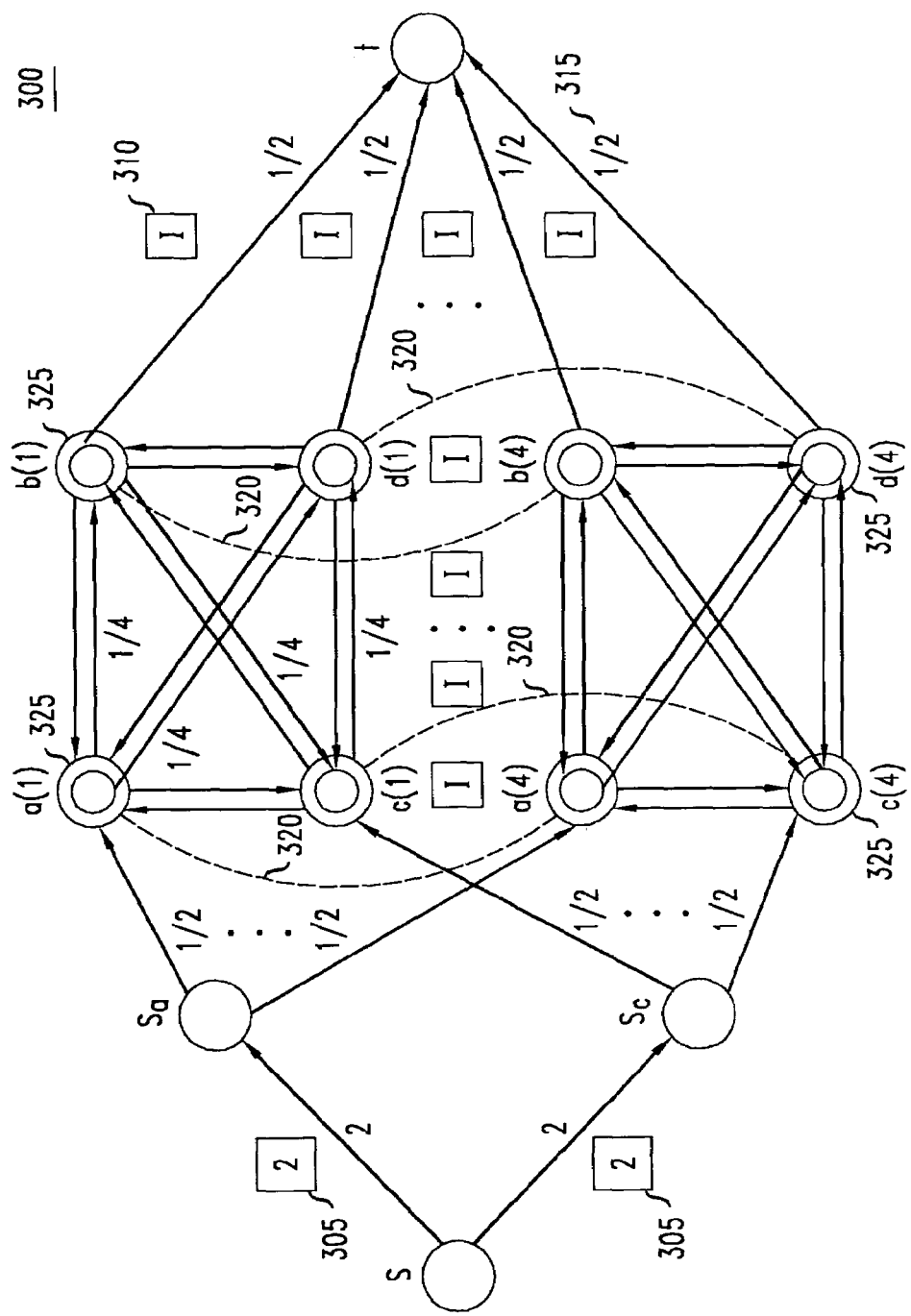
FIG. 3 shows the flow graph and the various flows for the illustrative mesh network depicted in FIG. 1 in accordance with the principles of the invention.

In accordance with the foregoing, FIG. 3 shows an illustrative flow graph 300 and the various flows for the illustrative mesh network depicted in FIG. 1 in accordance with the principles of the invention. In flow graph 300, the "boxed" edge labels represent edge capacities (for example, boxed edge labels 305) with all wireless edges having a capacity of one (not shown in FIG. 3). The label "I"0 represents infinite capacity (for example, label 310), and non-boxed edge labels are edge flow values (for example, non-boxed edge label 315). The "dashed" vertical edges (shown as curved in FIG. 3, see, for example, vertical edges 320) connect corresponding wireless nodes (labeled in FIG. 3 with an inner circle, see, for example, nodes 325). The traffic load for each non-gateway node v is l(v)=2 and is zero for gateway nodes.

Note that in general there may not exist a traffic routing for the WMN G that is able to satisfy the loads l(v) at all nodes v ∈ V. In this case we assume that the flow graph (and the flow there on) is constructed for the traffic routing that satisfies the loads λl(v) at all nodes v ∈ V for the largest possible value of λ. As detailed further hereinbelow, it will be shown that such a traffic routing is efficiently found in accordance with the principles of the invention.

3.2 Linear Programming Based Routing

In this section we show how to efficiently find such a routing that also satisfies all the necessary constraints for the joint channel assignment, routing and interference free link scheduling problem.

3.2.1 Routing and Channel Assignment Constraints: Necessary Conditions

As described above in Section 3.1, the wireless traffic routed between the nodes of the WMN and the gateway nodes for a given channel assignment can be mathematically described in terms of networks flows. Specifically, this connection can be made in terms of a flow graph H (as detailed above in Section 3.1) and the flow routed on it. We now define a set of constraints that must be satisfied by the flow on H. The goal is to find an optimal flow on H that satisfies these constraints and can also be used to derive an efficient routing and channel assignment solution for the network problem. We denote the set of nodes (edges) in H by V$^H$(E$^H$). We denote by f(e) (c(e)) the flow (capacity) on an edge e of H.

In terms of flow constraints, at any node v ∈ V$^H$ which is not the source node s or the sink node t the total incoming flow must equal the total outgoing flow:

$$\sum_{(u,v)\in E^H} f((u,v)) = \sum_{(u,v)\in E^H} f((v,u)), \forall v \in V^H - \{s, t\}$$

We would like the source node to send out the maximum possible amount of flow. Specifically the source node must send out the maximum flow on each of its outgoing edge limited only by the edge capacity. Note that this corresponds to routing the l(v) aggregate traffic load at each node V ∈ V of the WMN G. However, this may not always be possible and in this case we require a flow on each outgoing edge which is λ times its capacity (or λl(v) aggregate traffic load at each node v ∈ V) for the largest possible λ. This facilitates a fairness in the allocation of resources among wireless nodes and results in one constraint and one objective function (max λ):

$$f((s,s_v))=\lambda l(v), \forall v\in V$$

We must ensure that no capacities are violated:

$$f(e)\leq c(e), \forall e \in E^H$$

Recall that a WMN node v ∈ V has I(v) radios and hence can be assigned at most I(v) channels from 1≤i≤K. One way to model this constraint is to observe that due to interference constraints v can be involved in at most I(v) simultaneous communications (with different one hop neighbors). Thus, in any interference free schedule, for any node v ∈ V, at any time slot T it must be the case that $$\sum_{1\leq i\leq K}\sum_{e=(u,v)\in E} X_{e,i,\tau} + \sum_{1\leq i\leq K}\sum_{e=(v,u)\in E} X_{e,i,\tau} \leq I(v).$$

Note that this is not a very tight constraint for modeling the number of radios of a node. However, as shown below, this results in a relaxation which is not too far from the optimal. Adding these sets of equations for all time slots T and dividing by T this results in the constraint:

$$\sum_{1 \le i \le K} \sum_{e=(u,v)\in E} \alpha(e,i) + \sum_{1 \le i \le K} \sum_{e=(v,u)\in E} \alpha(e,i) \le I(v).$$

Recall that the fraction $\alpha(e,i)$ denotes the fractional link utilization for link e for channel i. In other words $$\alpha(e,i) = \frac{f(e,(i))}{c(e)}$$

for any $e \in E$ and channel i. This results in the following linear constraints for each node $v \in V$:

$$\sum_{1 \le i \le K} \sum_{e=(u,v)\in E} \frac{f(e(i))}{c(e)} + \sum_{1 \le i \le K} \sum_{e=(v,u)\in E} \frac{f(e(i))}{c(e)} \le I(v).$$

As such, we can restate the Link Congestion Constraint (as defined hereinbelow in Section 6.1.1; also see Section 6.1.1 for additional parameter definitions) in terms of link flows:

$$\frac{f(e(i))}{c(e)} + \sum_{e' \in I(e)} \frac{f(e'(i))}{c(e')} \le c(q), \forall e \in E_1 1 \le i \le K.$$

As stated previously, the objective function is given by "max $\lambda$". Also, it will be noted that all the constraints listed above are necessary conditions for any feasible solution. However, these constraints are not necessarily sufficient, as such, if a solution is found that satisfies these constraints it may not be a feasible solution. The RCL Methodology of the present invention begins with a "good" but not necessarily feasible solution that satisfies all of these constraints and use it to construct a feasible solution without impacting the quality of the solution.

3.2.2 Traffic Routing

We now formulate a linear program (LP) to find a flow that maximizes, subject to the above-described flow constraints, node radio constraints and link congestion constraints. The resulting LP (hereinafter "LP1") is as follows:
max $\lambda$, subject to $$\sum_{(u,v)\in E^H} f((u,v)) = \sum_{(v,u)\in E^H} f((v,u)),$$

$$\forall v \in V^H - \{s,t\} f((s,s_v)) = \lambda I(v), \forall v \in V f(e) \le c(e),$$

$$\forall e \in E^H \sum_{1 \le i \le K} \left( \sum_{e=(u,v)\in E} \frac{f(e(i))}{c(e)} + \sum_{e=(v,u)\in E} \frac{f(e(i))}{c(e)} \right) \le I(v),$$

$$v \in V \frac{f(e(i))}{c(e)} + \sum_{e' \in I(e)} \frac{f(e'(i))}{c(e')} \le c(q), \forall e \in E, 1 \le i \le K$$

The optimal solution to this LP1 is a flow on the flow graph H that maximizes $\lambda$ and satisfies all of the above-mentioned constraints. Although the solution yields the best possible $\lambda$, from a practical point of view some additional improvements may be possible: (i) the flow may have directed cycles. This may be the case since the LP does not try to minimize the amount of interference directly. By removing the flow on the directed cycle (equal amount off each edge) flow conservation is maintained and in addition since there are fewer transmissions the amount of interference is reduced; and (ii) flow may be going on long paths. Note that longer paths imply more link transmissions. Often, in this case system interference may be reduced by moving the flow to shorter paths. This is particularly true on flows going on two hop paths. Consider a flow on a two hop path from node u to node w when there is a direct edge from u to w. Assuming all three edges have equal capacity, one can move the maximum possible flow (limited by capacity constraints and the flow on the edges) off the two hop path to the direct edge while maintaining flow conservation thus reducing total interference. This scenario regarding two hop paths that can be bypassed by a single edge is typical for a wireless network due to the network's underlying geometrical structure. For example, all nodes in a circle of radius $R_T/2$ are connected to each other thereby forming a clique and any two hop path involving these nodes is bypassed by a direct edge.

Figure 4:
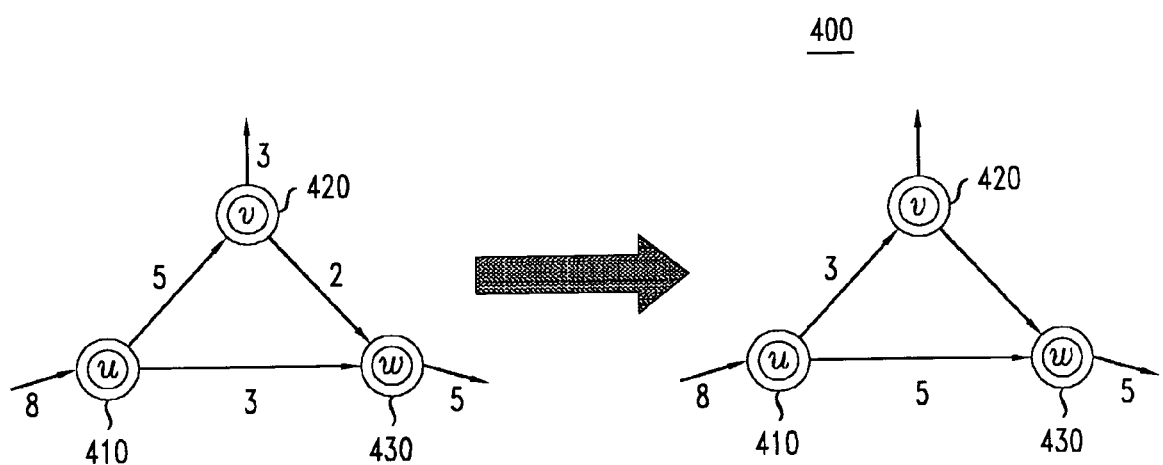
FIG. 4 shows an illustrative flow transformation in accordance with principles of the invention.

The aforementioned flow analysis is depicted in the illustrative flow transformation 4.00 shown in FIG. 4 for nodes 410, 420 and 430 (i.e., nodes u, v, w, respectively). As shown in FIG. 4, flow transformation 400 (edge labels denoting flow) has the maximum possible flow (i.e., two units) is moved from a two hop path (u, v, w) to a direct edge bypass (edge (It, w)). Note that this does not violate flow conversation at any node in flow transformation 400 and the interference resulting from node v's communications are reduced. Also, given that node u and w have the same amount of traffic communication (i.e., before and after) no new interference is introduced.

The above arguments suggest that it would be practical to find among all solutions that attain the optimal $\lambda$ value of $\lambda^*$ the one for which the total value of the following quantity (which by the below-described, in Section 6.1.1, Link Schedulability Constraint) is an intuitive measure of total interference) is minimized:

$$\sum_{1 \le i \le K} \sum_{e=(v,u)\in E} \frac{f(e(i))}{c(e)}.$$

Thus, resolving the LP with this objective function and with $\lambda$ fixed at $\lambda^*$:

$$\min \sum_{1 \le i \le K} \sum_{e=(v,u)\in E} \frac{f(e(i))}{c(e)} \text{ Subject to } \sum_{(u,v)\in E^H} f((u,v)) = \sum_{(v,u)\in E^H} f((v,u)),$$

$$\forall v \in V^H - \{s,t\} f((s,s_v)) = \lambda * I(v), \forall v \in V f(e) \le c(e),$$

$$\forall e \in E^H \sum_{1 \le i \le K} \left( \sum_{e=(u,v)\in E} \frac{f(e(i))}{c(e)} + \sum_{e=(v,u)\in E} \frac{f(e(i))}{c(e)} \right) \le I(v),$$

$$v \in V \frac{f(e(i))}{c(e)} + \sum_{e' \in I(e)} \frac{f(e'(i))}{c(e')} \le c(q), \forall e \in E, 1 \le i \le K.$$

The optimal solution to this LP (hereinafter "LP2") is a flow on the flow graph H that maximizes λ, satisfies all of the above-mentioned constraints and also tries to minimize the maximum interference per channel.

We now illustrate the routing step of the invention using the 4-node illustrative network shown in FIG. 1. Suppose there are a total of 4 channels and each node has 2 radio interfaces, and the edge capacities are 1 unit each and q=2 ($C_q$,=8). We assume that the interference range is large enough so that only one node can transmit at any given time on a given channel. We assume both nodes a and c have a demand of 2 units each. Let us denote $\in_1$=(a, b), $e_2$=(a, d), $e_3$=(c, b), $e_4$=(c, d). After completing the routing step in accordance with the invention, we may have the following set of edge flows as an optimal solution to the LP-based routing: f($e_j$(i))=¼, $\forall_{i,j}$=1,2,3,4. As will be appreciated such edge flows satisfy all the linear constraints in LP1 and is optimal. However, this flow is not feasible to the original throughput optimization problem since the channel assignment is not feasible (2 radios utilize 4 channels).

4. Channel Assignment

In this section, we present the channel assignment step (see, step 220 of FIG. 2) of the present invention which is used to adjust the flow on the flow graph (i.e., routing changes) to ensure a feasible channel assignment. This flow adjustment also strives to keep the increase in interference for each channel to a minimum. More particularly, we present the channel assignment step of the present invention that operates on a flow on the flow graph H for a traffic routing that satisfies the loads λ*l(v) at all nodes v ∈ V. Although this given flow satisfies the below-described Link Congestion Constraint (see, Section 6.1.1 hereinbelow) for all the channels, the induced channel assignment may not be feasible. The channel assignment step transforms the given flow to fix this infeasibility. In other words, this step ensures that for each v, the number of channel i such that f(e(i))>0, ∀e ∈ E and e incident on v, is no more than l(v). When the resulting flow of the channel assignment step is scaled, it is at least a $$\phi = \frac{c(q)K}{I}.$$

fraction of the original flow and hence satisfies at least the load I(v)λ/Ø at all nodes v ∈ V. The scaled flow also satisfies the below-described Link Schedulability Constraint (see, Section 6.1.1 hereinbelow) for all channels thus implying an interference free schedule for each channel can be obtained.

The channel assignment step works in phases and upon completion ensures that the number of channels assigned to any node v is at most the number of its interfaces I(v). We will assume without loss of generality that every edge e ∈ E has positive flow on at least one edge e(i) (f(e(i))>0) for some channel i in the flow graph H. This is because if there is one such edge e ∈ E with zero flow on all the edges e(i) the operations would not route any flow on any of the edges e(i) and hence edge e and all the edges e(i) may be removed from the network. In particular, the basic operation performed is to move some flow from edge e(i) to edge e(j) in the flow graph H for some link e=(u, v) ∈ E. Here i and j are two distinct channels. Note that in order to maintain flow conservation, this operation may also involve adjusting flows on the infinite capacity links between nodes u(i) and u(U), and between nodes v(i) and v(j) on the flow graph H. It will be appreciated that this adjustment to maintain flow conservation is always possible, and hence we need not explicitly mention this adjustment when discussing such operation herein. In this flow adjustment step we disregard edge capacities such that it is possible that the flow adjustment may lead to edge capacity violations. However, as discussed hereinbelow, these capacity violations can be resolved by a flow scaling.

Besides ensuring that the number of channels assigned to each node v is at most the number of its interfaces I(v) the steps of the present invention also strive to spread the interference evenly among the different channels, thus ensuring that for each channel the amount of interference is minimized. We use the following expression for measuring the interference on a link e ∈ E for a given channel i:

$$\text{Int}(e, i) = \frac{f(e(i))}{c(e)} + \sum_{e' \in I(e)} \frac{f(e'(i))}{c(e')}$$

The choice of this expression for measuring link interference follows from the observation that the below-defined "Link Schedulability Constraint" which is based on this expression is sufficient for finding an interference free schedule for the channel. Based on this expression we define the interference on a channel i as $$\text{Int}(i) = \max_{e \in E} \text{Int}(e, i)$$

We now describe the channel assignment operation of the present invention in greater detail. In particular, a node v is assigned to channel i if there exists an edge e incident on node v for which f(e(i))>0. Let I>1 denote the minimum number of radios at each wireless node. Let p(v) denote the so-called "aggregate fractional flow" on an edge e:

$$\mu(e) = \sum_{1 \leq i \leq K} \frac{f(e(i))}{c(e)}.$$

Let μ(v) denote the total "aggregate fractional flow" on the edges incident on node v.

$$\mu(v) = \sum_{e=(v,v) \in E} \mu(e) + \sum_{e=(v,v) \in E} \mu(e).$$

Essentially, the channel assignment operation of the invention operates in three phases. In the first phase the given network G=(V, E) is transformed into a network G'=(V', E') so that all nodes in G' have approximately I (between I and 2I−1) radios each. Given that the so-called node radio constraint for a node v ∈ V is satisfied in the flow graph H from the routing step, this phase ensures that the total aggregate fractional flow on the edges incident on a node v ∈ V' is at most I(v).

The network G' is created as follows: any node v ∈ V with I$r_1$+$r_2$ radios, for $r_1 \geq 2$ and I>$r_2 \geq 0$, is replaced by $r_1$ nodes in G'. All these nodes except at most one has I radios and the one exceptional node has I+$r_2$ radios. Let. these nodes (in V') be denoted by $v_1, V_2 \ldots V_{r1}$. Next, the edges incident on node v ∈ V are distributed among these nodes so as to assign approximately the same fractional flow μ($v_i$) to all nodes $v_i$. This is done while maintaining the constraint that μ($v_i$)≦I($v_i$) for all $v_i$. Further, this step iterates over the edges incident on node v. When considering an edge e, let vi denote the node with minimum current value for μ($v_i$) such that μ($v_i$)<I($v_i$). In case I($v_i$)−μ($v_i$)≧μ(e), then in G' edge e is made incident on node $v_i$. Otherwise a new copy e' of edge e is created. We set $p(e')=\mu(e')-(I(v_i)-\mu(v_i))$ and then set $\mu(e)=I(v_i)-\mu(v_i)$. Edge e is made incident on node $v_i$ and e' is the next edge considered in the edge iteration by this step. Pseudocode for this phase 1 of the channel assignment operation of the RCL Methodology is as follows:

```
Input: Network G = (V,E) with Aggregate Fractional Flow
    Values μ(e),e ∈ E and μ(v),v ∈ V
V' = ∅,E' = E
for v ∈ V {
    Let I(v) = Ir₁ + r₂,0 ≤ r₂ < I
    V' = V' ∪ {v₁,v₂,...v_{r₁}}
    I(v₁) = I + r₂
    if r₁ > 1, I(v_k) = I,2 ≤ k ≤ r₁
    μ(v_i) = 0,∀1 ≤ i ≤ r₁
    Stack Q = {e ∈ E',e = (u,v) or e = (v,u)}.
    While Q ≠ ∅ {
        Pop Stack Q to get edge e = (u,v)
        Let v_i has minimum μ(v_i) and μ(v_i) < I(v_i)
        μ = min{μ(e), I(v_i) − μ(v_i)}
        if μ < μ(e) {
            Copy edge e to e'
            μ(e') = μ(e) − μ
            E' = E' ∪ {e'}
            Push e' on top of Stack Q
        }
        μ(v_i) = μ(v_i) + μ
        e = (u,v_i), μ(e) = μ
    }
}
```

In accordance with the invention, at the end of phase 1 of the channel assignment step, the number of radios for each node is in the range I to 2I−1. In the next phase of the channel assignment step, the node radios are assigned channels, between 1 and I. The goal of this second phase of the channel assignment step, is to assign channels to nodes in V in such a way that for any given channel i the network formed by the set of edges e with $f(e(i))>0$ has a large number of connected components with small intra-component interference. This is useful because by assigning different channels to connected components with high inter-component interference the system interference is reduced. The channel assignment operation also ensures that at the end of phase 2 the channel interference Int(i) is at most $$\frac{Kc(q)}{I},$$

for all channels i. At the end of this second phase it is possible that two radios on a node are assigned the same channel (since due to node splitting in phase 1 these two radios are assigned to different nodes in V'). The third phase of the channel assignment step addresses these issues.

In the following description, for ease of presentation, we denote by G=(V,E) also the network output by the aforementioned phase 1 with aggregate fractional flow values $\mu(e),e \in E$ and $\mu(v),v \in V$, and number of radios $I(v),v \in V$. Recall that Int(i) denotes the interference for channel i and is computed based on the edge interference Int(e,i). For a given channel and flow assignment f(e(i)), let A be a connected component of the network formed by edges $e \in E$ with $f(e(i))>0$. We denote by Int(e, i, A) the interference on edge $e \in A$ for channel i by only considering the edges in A. We can then define the interference Int(i,A) for component A for channel i as the maximum value of Int(e, i,A) over all edges e in A. Finally, we define the component interference CompInt(i) for channel i as the maximum value of Int(i, A) for all connected components A for the network formed by edges $e \in E$ with $f(e(i))>0$.

The channel assignment operation starts with an empty channel assignment: setting $f(e(i))=0$ for all edges e and channels i. Thus, for each channel i, the channel's interference Int(i)=0 and component interference CompInt(i)=0. The channel assignment operation iterates over the nodes of the network in non-increasing order of the p(v) value. When considering a node v, it iterates over the edges e incident on node v that have not been considered in the non-increasing order of μ(e) values. When considering an edge e, I copies are made of edge e: e(1), e(2), . . . e(I) and the total edge e flow μ(e)c(e) is partitioned among these I copies as described next hereinbelow.

For each channel i, $1 \leq i \leq I$ the channel assignment step independently computes the maximum possible flow increase $\gamma(e(i)) \leq c(e)$ on edge e(i) such that the resulting total flow on edges e(k) for all channels k, $1 \leq k \leq I$ is at most max{c(e), μ(e)c(e)} and such that for this new flow the channel i interference Int(i) does not exceed $$\frac{Kc(q)}{I}.$$

Let I' be the set of channels i, $1 \leq i \leq I$ for which $\gamma(e(i))>0$. If I'=0 the channel assignment step proceeds to consider the next edge. Otherwise, let γ be the minimum value of γ(e(i)) among channels $i \in I'$. Let $k \in I'$ be a channel for which an increase in the flow f(e(k)) by γ results in the minimum (among all the channels in I') component interference $\max_{i \in I}$ CompInt(i). This step then increments f(e(k)) by γ(e(k)) for channel k. The aforementioned is repeated for edge e until (as mentioned above) I'=0. Pseudocode for this phase 2 channel assignment operation of the RCL Methodology is given as follows:

```
Input: Network G = (V, E) with Aggregate Fractional Flow
    Value μ(e), e ∈ E and μ(υ), υ ∈ V
f(e(i)) = 0, ∀ e ∈ E and 1 ≤ i ≤ I.
C = ∅ /* Set of edges considered so far */
for υ ∈ V in non-increasing order of μ(υ) {
    for e ∉ C, e incident on υ, in non-increasing order of
    μ(e){
        Add e to C
        while(true) {
            For all 1 ≤ i ≤ I {
                Compute γ(e(i)) ≤ c(e), the maximum possible
                flow increase on e(i) such that ∑_{k=1}^{I} f(e(k)) + γ(e(i)) ≤ μ(e)c(e) and Int(i) ≤ Kc(q)/I even with f(e(i)) increased by γ(e(i))
            }
            Let I' = {i|γ(e(i)) > 0}
            If I' = 0 then break
            Let γ = min_{i∈I'}CompInt(i) when
            f(e(j)) increased by γ
            Let v(k) by minimum among v(j), j ∈ I'
            f(e(k)) = f(e(k)) + γ(e(k))
        }
    }
}
```

Note that in the channel assignment obtained in phase 2 nodes are assigned (each of which has at least I radios) at most I channels (1, 2, . . . , I) each. In phase 3 of the channel assignment step, the channel assignment is further modified such that each node is still assigned at most I channels. However, these channels may range anywhere from 1 to K. This channel assignment is done with the goal of minimizing the overall intra-channel interference.

For the channel and flow assignment f(e(i)) that results from phase 2 consider a connected component A of the network formed by edges e ∈ E with f(e(i))>0 for some channel i. Note that all nodes in A are assigned channel i in this channel assignment, as such, A is assigned channel i in this channel assignment. Consider re-assigning channel k≠i to A. This entails moving f(e(i)) flow from edge e's copy e(i) to copy e(k) for all edges e in A. Note that after this transformation all edges e incident on node u ∈ A have f(e(i))=0. Thus, after the re-assignment no node u ∈ A is assigned to channel i anymore but is assigned to channel k. Thus, the number of distinct channels assigned to any node does not increase with this re-assignment.

If after phase 2 of the channel assignment step there are at most K connected components A among all channels (1, 2, . . . , I) then in phase 3 each of the connected components is assigned one of the K distinct channels. Otherwise, the connected components within the channels are grouped to make K groups. This grouping is done as follows: initially each connected component is in a group of its own. Analogous to the interference Int(i, A) within a component A for channel i, we can compute Int(i, P) the interference within a group P for channel i and we can define GroupInt(i) as the maximum value of Int(i, P) for all groups P in channel i. The operation greedily merges pair of groups belonging to the same channel to a single group such that the merging causes the least increase in $\max_{i=1}^{I}$, GroupInt(i) and until there are K groups. The connected components of the i-th group are then assigned channel i for 1≤i≤K.

In the last step of phase 3 the channel and flow assignment is mapped back to the original network G and its flow graph H. Recall that in phase 1 an edge e may have been split into multiple edges. Thus, after the channel assignment in phase 3 multiple copies (e.g., $e_1$, $e_2$, . . . $e_m$) of edge e may have positive flow in a given channel i. The flow on edge e(i) is then set as the sum total f(e(i))=$\Sigma_{k=1}^{m}$ f($e_k$(i)). Pseudocode for phase 3 of the channel assignment operation of the RCL Methodology is as follows:

```
Input: Network G' = (V',E') with f(e(i)) values for all channels
    i ≤ I and original network G = (V,E)
Let 0(i) = {A|A is a connected component assigned channel i}
while(Σ_{i=1}^{I} |0(i)| > K) {
    Let η_1,η_2 ∈ 0(i) such that {
        Removing the groups η_1,η_2 and adding the group
        η_1 ∪ η_2 to channel i causes least increase
        in max_{i=1}^{I} GroupInt(i)
    }
    Remove η_1,η_2 from 0(i)
    Add η_1 ∪ η_2 to 0(i)
}
0 = ∪0(i)
Assign channel i to the i-th group in 0
For all e ∈ E and 1 ≤ i ≤ K {
    Let e_1,e_2,...e_m ∈ E' correspond to edge e, f(e(i)) =
    Σ_{k=1}^{m} f(e_k(i))
}
```

Now, turning our attention to the 4-node illustrative network of FIG. 1 we next consider the routing step. Since all 4 nodes have the same number of radios, phase 1 of the channel assignment step is not needed. With respect to phase 2, from the routing step, we have μ($e_i$)=1, ∀i=1, 2, 3, 4 and μ(v)=2, ∀v=a, b, c, d. Since μ($e_i$) and μ(v) are all the same, the operation (in accordance with the invention) selects nodes in the order a, b, c, d and edges in the order $e_1$, $e_2$, $e_3$, $e_4$.

Note that for the edges $e_1$, $e_2$ that are incident on node a, γ($e_1$(i))=γ($e_2$(i))=μ($e_1$)=μ($e_2$), for i=1,2 (Int(i)=1<$KC_q$/I=$2C_q$). Therefore, in accordance with the invention, the RCL methodology sets f($e_1$(1))=1. For the second iteration (of the while loop, see phase 3 pseudocode hereinabove) for edges incident on a, $e_2$ causes the least intra-component interference if assigned channel 2 (CompInt(1)=2, CompInt(2)=1). Thus, the RCL methodology sets f($e_2$(2))=1. Similarly, in accordance with the invention, the RCL methodology sets f($e_3$(2))=1 since $e_3$ would increase the component interference for channel 1 more than channel 2. Finally, we have f($e_4$(1))=1. Note that there are 4 connected components in total after phase 2: {$e_1$}, {$e_4$} corresponding to channel 1 and {$e_i$}, {$e_4$} corresponding to channel 2. Since K=4, phase 3 of the channel assignment step assigns each edge $e_i$ a separate channel i. Thus, the only non-zero edge flows are f($e_1$(1))=f($e_2$(2))=f($e_3$(3))=f($e_4$(4))=1. This implies that nodes a , b , c , d are assigned channel pairs (1,2), (1,3), (3,4), (2,4) respectively. Note, this flow is already feasible. That is, the maximum interference is 1 and the flow scaling step has no effect.

5. Post Processing and Flow Scaling 5.1 Post Processing

In the post processing step (see, step 230 of FIG. 2) of the RCL Methodology of the present invention, the aim is to reduce the maximum interference suffered by the K channels, without affecting the feasibility of the channel assignment output by channel assignment step (see, e.g., step 220 of FIG. 2) of the RCL Methodology. This is accomplished by redistributing for each edge e=(u, v) ∈ E the flows on its copies e(i) for a channel i which is assigned to both nodes μ and node v. Note that this includes all channels i for which f(e(i))>0. This redistribution is done subject to the constraint that the total flow on the copies f(e(i)) does not change. Note that this redistribution only results in an adjustment in the routing and it does not have any affect on the feasibility of the channel assignment. The latter is due to the fact that if an end-node u of edge e is not assigned channel i before this step then f(e(i))=0 after the step and hence node ti is not assigned channel i after this step. Thus the number of channels assigned to a node can only decrease after this step of the RCL Methodology of the invention.

In order to optimally solve the problem of flow re-distribution to minimize the maximum interference on the K channels we formulate the flow re-distribution problem as a linear program. Recall that F(v) is the set of channels assigned to node v. A channel i is in F(v) if and only if there exists an edge e ∈ E incident on node v (outgoing or incoming) such that f(e(i))>0. We denote the total flow assigned to the copies of edge e by the previous step by ρ(e). We will denote the new flows assigned by the linear program to an edge e and its copy for channel i also by f(e(i)). This LP is given by:

min β, subject to:

$$f((s, s_v)) = \lambda * l(v), \forall v \in V$$
$$f(e(i)) \leq \beta c(e), \forall e \in E, 1 \leq i \leq K$$
$$f(e(i)) = 0,$$

-continued $$\forall e = (u, v) \in E, \forall i \notin F(u) \cup F(v)$$

$$\sum_{1 \le l \le K} f(e(i)) = \rho(e),$$

$$\forall e = (u, v) \in E$$

$$\frac{f(e(i))}{c(e)} + \sum_{e' \in I(e)} \frac{f(e'(i))}{c(e')} \le \beta, \forall e \in E, 1 \le i \le K$$

Note that in the right hand side of the aforementioned LP we use the term $\beta c(e)$ as the capacity of edge e in order to effectively deal with the edge capacity violations occurring in the channel assignment operation.

5.2 Flow Scaling

In the flow scaling step tsee, step 240 of FIG. 2) of the invention the maximum value of interference for the K channels is computed, namely a scale L given by: $\zeta = \max\{1, \max_{1 \le i \le K} \text{Int}(i)\}$. Next the RCL Methodology scales all flow values in the flow graph H by $\zeta$: thus the new flow value for any edge e in the flow graph is set to:

$$f(e) = \frac{f'(e)}{\zeta}$$

where f'(e) is the flow value on edge e of the flow graph after the post processing step of the invention. Note also that $\lambda^A = \lambda^*/\zeta$, where $\lambda^A$ is the new $\lambda$ value corresponding to this scaled flow. Recall that $\lambda^*$ is the optimal value for LP1 (as detailed hereinabove). Thus, at the end of this step of the RCL Methodology it is guaranteed that for each channel i the interference Int(i)<1. This also implies that for any edge e ∈ E and any channel i the interference Int(i)<1.

6. Interference Free Link Scheduling

This section will describe the interference free link scheduling step (See, step 250 of FIG. 2) of the RCL Methodology in the context of the following question: Given a channel assignment to the wireless node radios (interfaces) and a traffic routing that is able to route l(v) outgoing traffic load for each node v ∈ V what are the necessary and sufficient conditions under which the edge communications of the routing solution can be scheduled free of interference. The main results are a necessary condition which is "almost" sufficient: it can be made sufficient by reducing the amount of routed traffic by a small constant factor. In addition, the RCL Methodology is designed to find such an interference free link communication scheduling whenever the sufficient condition is satisfied by the channel assignment and traffic routing solution. The results obtained from the RCL Methodology of the present invention are an extension to those for the single channel case as detailed in V. Kumar et al., Algorithmic aspects of capacity in wireless networks, *In. Proc. ACM SIGMETRICS*, pp. 133-144, 2005, which is hereby incorporated by reference herein, and for the protocol model of interference as detailed in P. Gupta et al., The Capacity of Wireless Networks, *IEEE Transactions on Information Theory*, IT-46 (2):388-404, March, 2000, which is hereby incorporated by reference herein. We first study the interference free link scheduling problem independently for a single channel (e.g., channel 1) and then show how these independently obtained single channel solutions are easily "merged" to obtain an interference free link schedule for all channels.

6.1 Interference Free Link Flow Scheduling for a Single Channel

We assume a periodic (with period T) time slotted schedule S in which in each slot the links scheduled for transmission do not interfere with each other. Let $X_{e,i,\tau}$, e ∈ E, i ∈ F(e), $\tau \le 1$ be the indicator variable where $X_{e,i,\tau}$ is 1 if and only if link e is active in slot $\tau$ on channel i. Recall that F(e) is the set of channels in common among the set of channels assigned to the end-nodes of edge e. Thus, the fraction of time link e is active in schedule S on channel i is $$\frac{1}{T} \sum_{1 \le \tau \le T} X_{e,i,\tau}.$$

We denote this fraction by $\alpha(e, i)$ the so-called "fractional link utilization" for channel i. Since we are focusing on one channel (i.e., channel 1), for ease of exposition in this section, we will denote this fraction by a(e) and the indicator variable $X_{e,\tau}$.

Next, the connection with flows on the edges of G and the edge communication schedules is made. Note that we must have $f(e(1)) = \alpha(X(e)c(e)$. Recall that f(e(i)) is the rate (denoted by flow) at which traffic is transmitted by node u for node v on channel i for an edge e=(u, v) ∈ E. Since edge e is active $\alpha(e)$ fraction of time on channel 1 and its rate (when active) is c(e) the equality follows. This connection between the edge flows and the edge schedules is useful in deriving some necessary conditions that the edge flows in any feasible joint channel assignment and routing solution must satisfy to be feasible under interference constraints. The basis for the interference model herein are based on geometric considerations.

6.1.1 Link Flow Scheduling: Necessary and Sufficient Conditions

For an edge e we denote by I(e) as the set of edges that interfere with it as defined above in Section 1.2. Recall that this interference is defined by an interference range $R_I$ which is assumed to be q times a transmission range $R_T$ for some small fixed value q. Based on geometric arguments we can show the following:

1. For any slot $\tau$ any valid interference free edge communication schedule S must satisfy:

$$X_{e,\tau} + \sum_{e' \in I(e)} X_{e',\tau} \le c(q),$$

where c(q) is a constant that depends only on q. For example, c(q)=4,8,12 for q=1, 2, 2.5 respectively.

PROOF. We prove the following for q=2 and proofs for other values of q can be derived along similar lines. Recall that an edge e' ∈ I(e) if there exist two nodes x, y ∈ V which are at most $2R_T$ apart and such that edge e is incident on node x and edge e' is incident on node y. Let e=(u, v). Consider the region C formed by the union of two circles $C_u$ and $C_v$, of radius $2R_T$ each, centered at node u and node v respectively. Then e'=(u', v') ∈ I (e) if an only if at least one of the two nodes u', v' is in C; and denote such a node by C(e').

Given two edges $e_1, e_2 \in$ I(e) that do not interfere with each other we must have that the nodes $C(e_1)$ and $C(e_2)$ are at least $2R_T$ apart. Thus, an upper bound on how many edges in I(e) that do not pair-wise interfere with each other can be obtained by computing how may nodes can be put in C that are pair-wise at least $2R_T$ apart. For an even looser upper bound we can extend C to a circle $C_e$ of radius $3.5R_T$ which is centered in the middle of the line joining the endpoints of edge e and reformulate the above question as a circle packing problem: how many maximum circles of radius $R_T$ can be packed (without overlap) in the circle $C_e$ of radius $3.5R_T$. From LEMMA 1 above it follows that this number is 8. Thus, among the edges in I(e) every "independent" set is of a maximum size of 8. Further, in schedule S in a given slot only one of the two possibilities exist: either edge e is scheduled or an "independent" set of edges in I(e) of size at most 8 is scheduled implying the claimed bound. A necessary condition: From Lemma 1 above it follows that a necessary condition (the "Link Congestion Constraint") for the edge flows (for each channel) is:

LEMMA 2. Any valid "interference free" edge flows must satisfy for channel 1 (and equivalently for other channels) the Link Congestion Constraint:

$$\frac{f(e(1))}{c(e)} + \sum_{e' \in I(e)} \frac{f(e'(1))}{c(e')} \leq c(q).$$

(The above being referred to throughout this disclosure as the "Link Congestion Constraint").

PROOF. Recall that we are only considering channel 1. Adding up the inequality in Lemma 1 for the first T time slots and dividing the resulting by T we obtain:

$$\frac{1}{T}\sum_{1 \leq \tau \leq T} X_{e,\tau} + \sum_{e' \in I(e)} \frac{1}{T}\sum_{1 \leq \tau \leq T} X_{e',\tau} \leq c(q).$$

This is equivalent to $$\alpha(e) + \sum_{e' \in I(e)} \alpha(e') \leq c(q)$$

and the result follows from the definition of $\alpha(e)$.

Next we formulate a matching sufficient condition for an interference free edge communication schedule.

A sufficient condition: A sufficient condition (herein referred to as the "Link Congestion Constraint) for the edge flows (for each channel) is:

LEMMA 3. If the edge flows satisfy for channel 1 (and equivalently for other channels) the following "Link Schedulability Constraint" can be found:

$$\frac{f(e(1))}{c(e)} + \sum_{e' \in I(e)} \frac{f(e'(1))}{c(e')} \leq 1.$$

(The above being referred to throughout this disclosure as the "Link Schedulability Constraint).

The proof of this Lemma 3 is established by demonstrating an operation which can find an interference free edge communication schedule and such an operation is presented next in accordance with the RCL Methodology of the present invention.

6.1.2 Link Flow Scheduling

The following describes an operation that given the edge flows will find an interference free schedule of the edges for channel 1 (equivalently for any given channel). It will be noted that the following link scheduling operation is presented in a centralized version, however, the operation is not limited to a centralized form and those skilled the art will appreciate that the operation could also be designed in a distributed version.

Given the edge flows for channel 1 the link flow scheduling operation finds an interference free periodic schedule S of period T (for some large number T) for communication on edges for channel 1 (equivalently for any given channel) such that the schedule satisfies the following two requirements:

(1) The fraction of time slots in which edge e is scheduled is given by $$\frac{1}{T}\sum_{1 \leq \tau \leq T} X_{e,\tau} = \frac{f(e(1))}{c(e)}.$$

Recall that f(e(1)) is the flow on channel 1 for edge e; and (2) Two edges that interfere with each other are not assigned to the same slot.

Note that these conditions ensure that edge communication schedule S is interference free and achieves the edge flows for channel 1 (equivalently for any given channel). While omitting the proof therefore, the following Lemma is directed to the sufficient condition for schedulability:

LEMMA 4. If the edge flows for channel 1 (equivalently for any given channel) satisfies the Link Schedulability Constraint (as set forth above) then an interference free schedule for the edges for channel 1 (equivalently for any given channel) can be found by the link scheduling operation.

The following is pseudocode for the illustrative link scheduling (single channel case) operation:

```
Set Available slots to 1,2...T.
Initialize S(e_i) = 0, ∀i = 1,...,m
for i = 1,...,m {
    Set S(e_i) to first available N(e_i) slots such that
        S(e_i) ∩ ∪_{e_j ∈ I(e_i)} S(e_j) = 0
}
```

Here we assume T is chosen to be a large number (e.g., 1000). The operation schedules each edge e in $$N(e) = T\frac{f(e(1))}{c(e)}$$

slots. We assume edges in E are ordered as $e_1, e_2 \ldots e_m$. Since S is periodic, the link scheduling operation only outputs the schedule for first T slots. We use S(e) to denote the set of time slots in which edge e is scheduled in S. Note that by construction the link scheduling operation (as depicted in the aforementioned pseudocode) outputs an interference free schedule.

6.2 Interference Free Link Flow Scheduling for All Channels

In this section, we provide necessary and sufficient conditions under which the edge communications for more than one channel can be scheduled free of interference (see, step

250 of FIG. 2) for a given assignment to the wireless node radios and a traffic routing that is able to route l(v) outgoing traffic load for each node v ∈ V. In this multiple channel case: (i) Necessary Condition: The edge flows for any given channel must satisfy the Link Congestion Constraint (as set forth above); and (ii) Sufficient Condition: The edge flows for any given channel must satisfy the Link Schedulability Constraint (as set forth above). If the solution satisfies the Sufficient Condition then the following "merging" operation can be used for finding an interference free edge communication schedule. Here T is again picked to be a large number (e.g., 1000). We denote by $S_i$ the schedule for edge flows for channel i obtained using the single channel link scheduling operation as previously presented. We denote by $S_i(r)$ the set of edges scheduled at time slot τ by $S_i$. We denote by S(τ) the set of tuples denoting an edge and a channel pair corresponding to the edge in the tuple being scheduled on the channel in the tuple at time slot τ by S. The following is pseudocode for the this illustrative link scheduling (multiple channel case) operation:

---
Set Available slots to 1,2...T.
Initialize $S(e_i) = \emptyset$, ∀i = 1,...,m
for i = 1,...,m {
    Set $S(e_i)$ to first available $N(e_i)$ slots such that
        $S(e_i) \cap \cup_{e_j \in I(e_i)} S(e_j) = \emptyset$.
}
---

The interference free edge communication scheduling problem is NP-hard in general in view of the set of edge flows is as hard as edge coloring even for very simple interference models. Thus, efficient approximation for this problem is the goal of the following:

THEOREM 1. The link scheduling operation for multiple channels (as set forth above) can be used to design a c(q) approximation for finding interference free edge communication schedule, where c(q) is a constant defined in the above-identified Lemma 1.

PROOF. Note that given an edge flow it must satisfy the necessary condition (i.e., the Link Congestion Constraint for the edge flow for each channel or otherwise it is not schedulable. Thus, by scaling the given edge flows by a factor c(q) the edge flows must also satisfy the Link Schedulability Constraint (as defined above) for the flow on each channel. The multiple channel link scheduling operation will then able to find an interference free edge communication schedule for these edge flows. Note that scaling edge flows by a factor of at most c(q) has the effect that in the corresponding routing at least 1/c(q) fraction of the l(v) outgoing traffic load for each node v ∈ V is routed and the approximation bound follows. Thus, the multiple channel link scheduling operation is able to compute an interference free link schedule if the routing and channel assignment is known.

Section 7 Analysis of RCL Methodology

In this section, we illustrate how the RCL Methodology of the present invention, in finding a feasible solution to the joint channel assignment, routing and interference free edge communication scheduling problem, is computationally efficient and has a provable worst case performance bound (i.e., a constant that depends only on the total number of channels). It will be appreciated that routing, scheduling, post processing and scaling, in accordance with the RCL Methodology, takes polynomial time, therefore, we only need to show that channel assignment step takes polynomial time in order to show that RCL runs in polynomial time. So, LEMMA 5. Phase 1 of the channel assignment operation (as set forth hereinabove) runs in time polynomial an |V|, |E|, K/I and ensures that the total aggregate fractional flow on all the edges introduced in E' for every edge e ∈ E in phase 1 equals the aggregate fractional flow on edge e in the original network G.

PROOF. Referring to the pseudocode for phase 1 of the channel assignment operation (as set forth hereinabove) for a given node v ∈ V each time a copy e' ∈ E' of its incident edge e ∈ E is created to be added to the top of stack Q at least one new node $v_I \in V'$ among $v_1, V_2, \ldots v_I$ gets saturated ($\mu(v_i) = I(v_i)$). We show hereinbelow that at or before all nodes $v_1, v_2, \ldots v_{r_1}$ get saturated the aggregate fractional flow on every edge e ∈ E incident on node v ∈ V is assigned to the edges introduced for it in E'. Thus, at most $r_1 < K/I$ additional edges are added to Q in total for each vertex v ∈ V implying a polynomial running time for phase 1 of the channel assignment operation.

In the original flow graph the total aggregate fractional flow on any node v is at most the number of its radios. Thus $\mu(v) \leq r_1 I + r_2 = \Sigma_{i=1}^{r_1} I(v_1)$. Note that at any step in the operation $\mu(v_i) \leq \mu(v)$ with the inequality being strictly less than as long as the aggregate fractional flow $\mu(e)$ on some edge e ∈ E incident on vertex v is not fully assigned to the edges introduced for it in E'. Thus, as long as there is an edge e ∈ E incident on vertex v ∈ V whose aggregate fractional flow $\mu(e)$ is not fully assigned to the edges introduced for it in E' we have $\Sigma_{i=1}^{r_1} \mu(v_i) < \Sigma_{i=1}^{r_1} I(v_1)$ and therefore some node $v_i$ must not be saturated. Thus, the operation cannot reach a state where all nodes are saturated and the aggregate fractional flow $\mu(e)$ is not fully assigned to the edges introduced for it in E'.

LEMMA 6. Phase 2 of the channel assignment operation (as set forth above) runs in time polynomial in K, |V|, |E|.

PROOF. Referring to the pseudocode for phase 2 of the channel assignment operation (as set forth above) for a given node v ∈ V any of its incident edge e ∈ E is processed only once in the inner "while" loop. Because, before processing the edge e in the inner while loop, it is added to C so that it is not processed again. For a given edge e the inner while loop iterates at most I+K times because after each iteration either the channel k gets saturated for edge e: the maximum possible flow increase on edge e(k) is done in the iteration or there is a c(e) flow increase on some edge e(i). The latter can only happen at most K times since $\mu(e(i)) < 1, 1 \leq i \leq K$ in the original flow graph and, therefore, total flow on edge e is at most $\mu(e)c(e) \leq Kc(e)$. In the former case, channel k does not appear in the set I' in any subsequent iterations for edge e. Thus, with every such iteration |I'| decreases by at least once and since |I'| ≤ I in the first iteration, the bound on the number of iterations follow. Thus, the operation runs in polynomial time. So, LEMMA 7. If in the original flow graph H the flow satisfies the Link Congestion Constraint for every channel i, $1 \leq i \leq K$ then in phase 2 of the channel assignment operation the flow $\mu(e)c(e)$ on every edge e ∈ E gets assigned to the edges e(k) for channels $1 \leq k \leq I$. That is, on termination the following holds for all edges:

$$\mu(e)c(e) = \sum_{i=1}^{I} f(e(i)).$$

PROOF. By Lemma 5 previously, the total aggregate fractional flow and hence the total flow on all the edges introduced in E' for every edge e ∈ E in phase 1 of the channel assignment operation equals the aggregate fractional flow and hence the flow on edge e in the original network G. Also, note that the interference relationships between edges does not change in phase 1, therefore, the only change is that an edge e ∈ E in the original network E may be split into multiple (mutually interfering edges) edges in E' whose total flow in the new network G' equals the flow on edge e in the network G.

Consider the flow on the original flow graph H. Since such flow satisfies the Link Congestion Constraint for every channel i, $1 \leq i \leq K$ in the flow graph H, Int(i)<c(q) for every channel i, $1 \leq i \leq K$. Therefore, for the flow in the flow graph H, the total interference over all channel: satisfies Int(i)≦Kc(q). As such, in phase 2 when the total aggregate fractional flow (and hence the total flow on the edges in the network output by phase 1) is distributed over the different channels the total interference over all channels must still be bounded above by Kc(q). In particular, this must hold at every iteration of the inner while loop set forth in the pseudocode for phase 2 of the channel assignment operation.

Turning our attention to the pseudocode of the phase 2 operation and the proof of Lemma 6 (both as set forth hereinabove) it follows that if on termination of the inner while loop for an edge e it holds that $\Sigma_{i=1}^{I} f(e(i)) < \mu(e)c(e)$ then on the termination of the while loop all channels must get saturated due to the interference constraints. That is, after the iterations of the while loop for the edge e it must hold that the interference due to edge e on channel k satisfies Int $$(e, k) = \frac{KC(q)}{I}$$

for all channels k, $1 \leq k \leq I$. Also, note that in phase 2 the interference on any other channel is 0: Int(i)=0, i>I. Hence, it holds that the total interference due to edge e on all channels after the iterations of the while loop is given $\Sigma_{k=1}^{I} \text{Int}(e,k) = c(q)$ But since $\Sigma_{i=1}^{I} f(e(i)) < \mu(e)c(e)$ there is still some positive flow left over for edge e that is not assigned to any channel at this point. When this flow is assigned to any of the channels the total interference due to edge e for all channels would strictly exceed Kc(q). But as shown before, no matter what distribution of edge flows over the channels is used the total channel interference and hence the total channel interference due to edge e cannot exceed Kc(q), a contradiction. This establishes that $\Sigma_{i=1}^{I} f(e(i)) = \mu(e)c(e)$ for all edges e in the flow distribution resulting from phase 2 of the channel assignment operation.

In view of the foregoing, it will be understood that phase 3 of the channel assignment operation runs in polynomial time since in each iteration the number of groups are reduced by at least one. Hence, the total running time is bounded by the number of connected components in the K channels, and is therefore bounded by |E|K.

LEMMA 8. After flow scaling (see, step 240 of FIG. 2), the resulting flow satisfies the link capacity constraints for each channel.

PROOF. Recall that the flow scaling ensures that Int(i)≦1 for all channels i. This in turn implies that Int(e, i)≦1 for every edge e(i) in every channel i. In particular this implies that $$\frac{f(e(i))}{c(e)} \leq 1$$

for all edges e(i) in every channel i. This also implies that the flow f(e(i)) on edge e(i) is at most the capacity of edge e for every edge e with positive flow in any channel i.

LEMMA 9. At the end of phase 3 of the channel assignment operation the resulting channel assignment is feasible.

PROOF. Recall that in the channel assignment a node v ∈ V is assigned channel i if and only if f(e(i))>0 for some edge e ∈ E incident on node v. In phase 1 of the channel assignment operation, a node v ∈ V with $\tau_1 I + \tau_2$ is split into $\tau_1$ nodes in V' each with at least I radios. In phase 2 of the channel assignment operation, each of these $\tau_1$ nodes in V' is assigned at most I channels each from among the channel set $\{1, 2, \ldots, I\}$. In phase 3 of the channel assignment operation, channels are reassigned to these $\tau_1$ nodes without increasing the number of channels assigned to each node. Thus, these $\tau_1$ nodes in V' are assigned at most I channels each. Finally the set of channels assigned to these $\tau_1$ nodes are assigned to the corresponding node v ∈ V. As such, node v which has $\tau_1 + \tau_2$ radios gets at most $\tau_1 I$ channels implying the feasibility of the channel assignment.

THEOREM 2. The RCL Methodology as a $$\frac{KC(q)}{I}$$

approximation for the joint routing and channel assignment with interference free edge scheduling problem.

PROOF. Referring to the pseudocode for phase 2 of the channel assignment operation, it follows that on termination of phase 2 the interference on all channels is bounded as $$Int(i) \leq \frac{KC(q)}{I}.$$

Further, phase 3 of the channel assignment operation redistributes the edge flows over the K channels without increasing the interference on any channel, because, in phase 3 the flows moved to a channel j all come from the edges e(i) in a single channel i. Thus, $$Int(j) \leq Int(i) \leq \frac{Kc(q)}{I},$$

therefore, in phase 3 the following must hold:

$$\zeta \leq \frac{Kc(q)}{I}.$$

Also, postprocessing only reduces the maximum interference. In the flow scaling step of the RCL Methodology, the flow is scaled by ζ. Therefore, the scaled flow corresponds to a λ value which is at least $$\lambda^A = \frac{\lambda^*}{\frac{c(q)K}{l_*}}.$$

Since the optimal λ value is at most λ* and since the scaled flow satisfies the sufficient condition (i.e., Link Schedulability Constraint for all channels) for it to be scheduled, by the link scheduling operation of the RCL Methodology, the approximation bound follows.

Section 8—Evaluation of RCL Methodology

In this Section, we (i) evaluate the performance of the RCL Methodology of the present invention and (ii) use the RCL Methodology to evaluate the performance gain of using multiple radios and multiple channels for wireless mesh networks. In terms of the first evaluation, it would be useful to compare the performance of the RCL Methodology against the optimal solution. However, the joint channel assignment and routing problem for WMNs quickly becomes intractable and any meaningful scenarios cannot be optimally solved in any practical setting. Therefore, another option and the one discussed in greater detail hereinbelow, is to compare the average case performance of the RCL Methodology versus the worst case bound (i.e., the worse case bound established and described hereinabove). For the second evaluation discussed hereinbelow, two sensitivity analysis studies are presented that evaluate the improvement in the network throughput as the number of channels are increased and as the number of radios are increased.

In performing the evaluations, the linear programs of the RCL Methodology are solved using CPLEX (a well-known optimizer, see, e.g., ILOG CPLEX mathematical programming optimizers at www.ilog.com/products/cplex). As detailed above, the channel assignment operation of the invention uses the solution of LP2 as input, and the channel assignment together with the total edge flow and λ* from LP2 are the inputs to LP3. After postprocessing by LP3, we obtain ζ to define the feasible per-node throughput λ*/ζ. The evaluations were performed on a number of realistic topologies and the simulation setup employed is as follows: The WMNs employ IEEE 802.11a radios (i.e., radios conforming with the well-known IEEE 802.11a specification) in a simple wireless channel model in which link rates depend only on the distance between the links two end mesh network nodes. Adopting the values commonly referenced by IEEE 802.11a equipment vendors, we assume that the link rate when the two end mesh nodes are within 30 meters is 54 Mbps, 48 Mbps when within 32 meters, 36 Mbps when within 37 meters, 24 Mbps when within 45 meters, 18 Mbps when within 60 meters, 12 Mbps when within 69 meters, 9 Mbps when within 77 meters and 6 Mbps when within 90 meters. The maximum transmission range $R_T$ is 90 meters and the maximum interference range is 180 meters. We employed 12 channels available according to the IEEE 802.11a specification. For simplicity, an assumption was made that the gateway nodes have sufficient wired backhaul capacity for them not to be a bottleneck.

Finally, as further background for the evaluations below, we generated grid and random topologies, and simulations were executed with different parameter settings. The simulation results are reported in accordance with the following parameters: (i) a total of 60 nodes; (ii) for the grid topology, the grid size is 8×8, the distance between two adjacent grid points is 0.65 $R_T$ and nodes are placed in grid points randomly; (iii) 9 random connected topologies were generated by placing nodes randomly in a 500×500 square meter area; (iv) a random sample of 20 nodes was selected to have a traffic demand of 20 Mbps each; (v) the number of gateway nodes was varied from 2 to 12, the number of radios varied from 1 to 4 and the number of available channels varied from 1 to 12; and (vi) a uniform number of radios at all nodes.

8.1 The Performance Impact of Multi-Channel

Figure 5A:
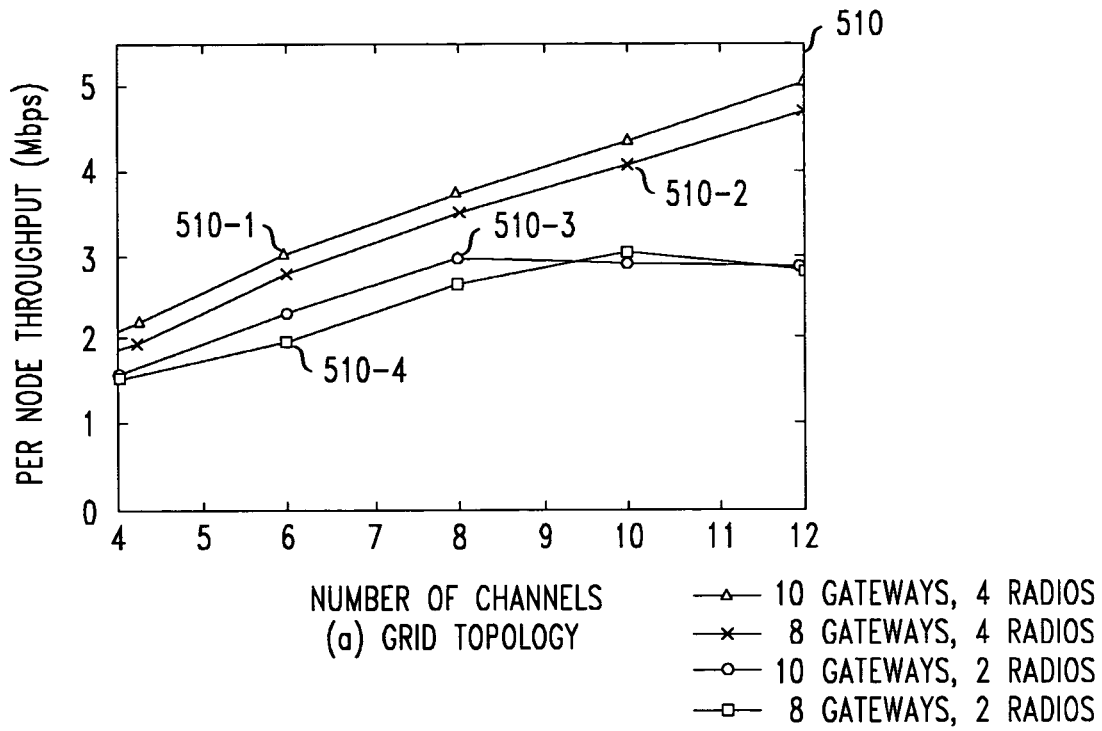
FIGS. 5A and 5B show evaluation results, in graphical form, of the RCL Methodology of the present invention, for four WMN configurations having a varying number of gateways and radios.
Figure 5B:
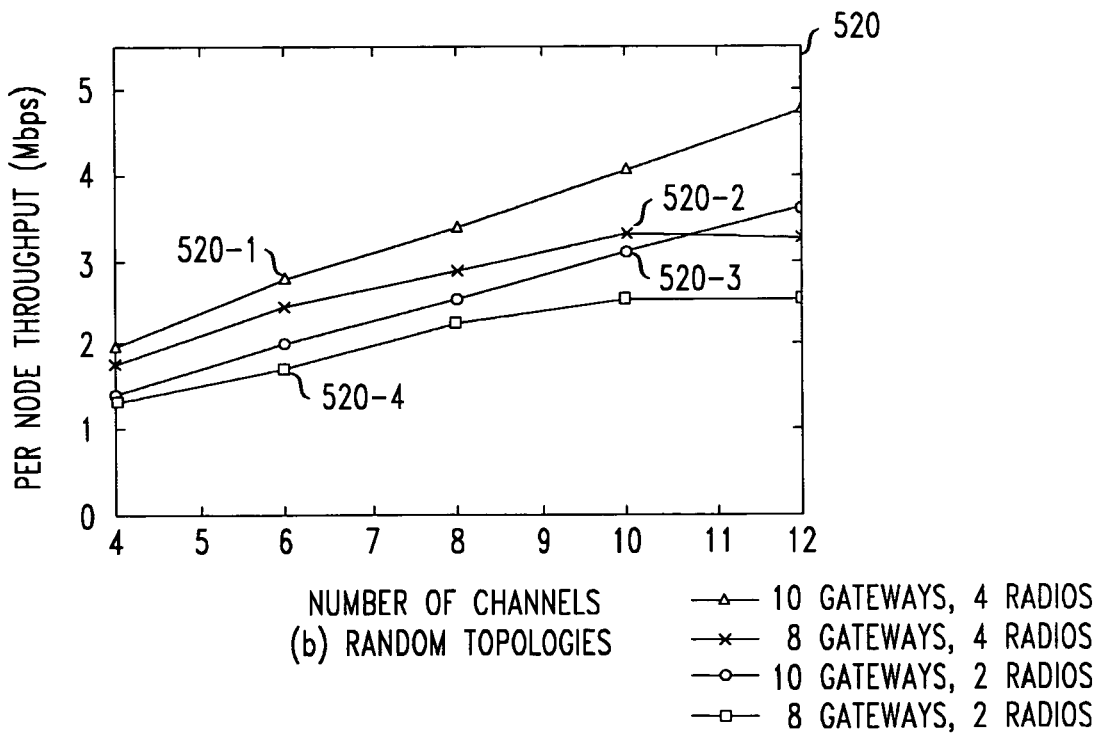

In this evaluation, we varied the number of channels in the 60-node grid topology and random topologies to study the impact on the network throughput. In particular, FIGS. 5A and 5B show evaluation results, in graphical form, of the RCL Methodology for four WMN configurations having varying a number of gateways and radios. In particular, graph 510 shows graphical results for a grid topology for four different gateway/radio configurations (510-1, 510-2, 510-3 and 510-4, respectively), and graph 520 shows graphical results for random topologies for four different gateway/radio configurations (520-1, 520-2, 520-3 and 520-4, respectively). As shown in FIGS. 5A and 5B, the results of graph 510 and graph 520 are each shown in terms of "per node throughput (Mbps)" vs. "number of channels". In graph 520, each data point for random topologies is averaged over the 9 topologies.

As expected, observe the trend in results of FIGS. 5A and 5B that, as the number of channels increase, the per-node throughput generally increases. However, it will be noted that the per-node throughput of our RCL Methodology may not always increase when the number of channels increase. This is because the channel assignment operation is not necessarily optimal and its performance depends on the network flow output by the routing step. In practice, one can use the solution with the highest throughput output by the channel assignment operation. From the evaluation results in FIGS. 5A and 5B, one can see that the RCL Methodology in general can effectively exploit the increasing number of channels available. For example, with 10 gateways and 4 radios (see, 510-1 and 520-1), as the number of channels goes from 4 to 12, the per-node throughput goes from 2.1 Mbps to 5.0 Mbps for the grid topology (see, 510-1) case; and from 2.0 Mbps to 4.8 Mbps for the random topologies (see, 520-1) case.

8.2 The Performance Impact of Multi-Radio

Figure 6A:
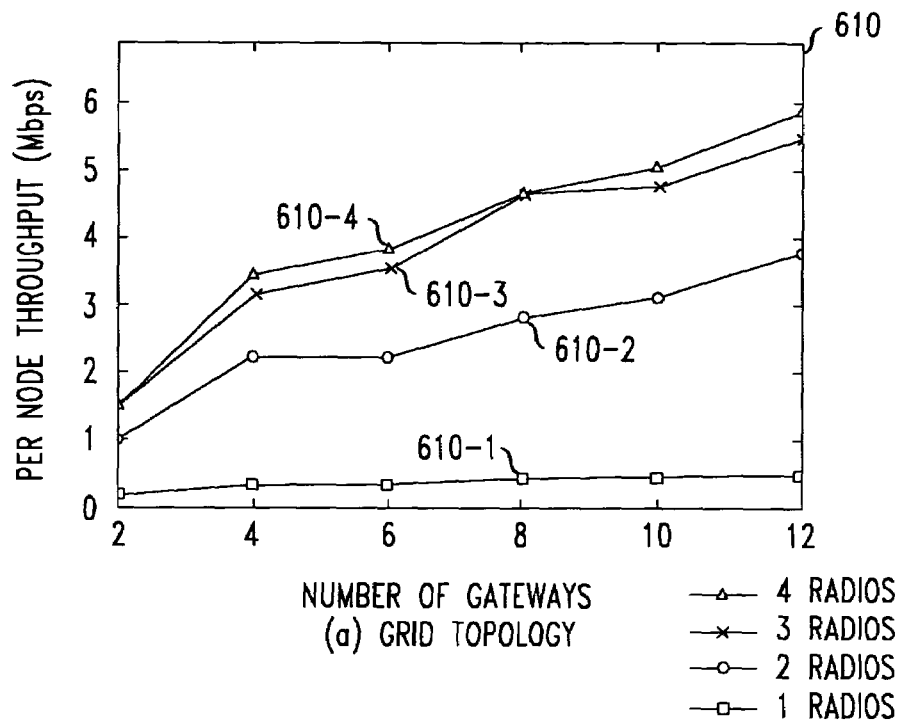
FIGS. 6A and 6B show evaluation results, in graphical form, of the RCL Methodology of the present invention, for four WMN configurations having a varying number of radios.
Figure 6B:
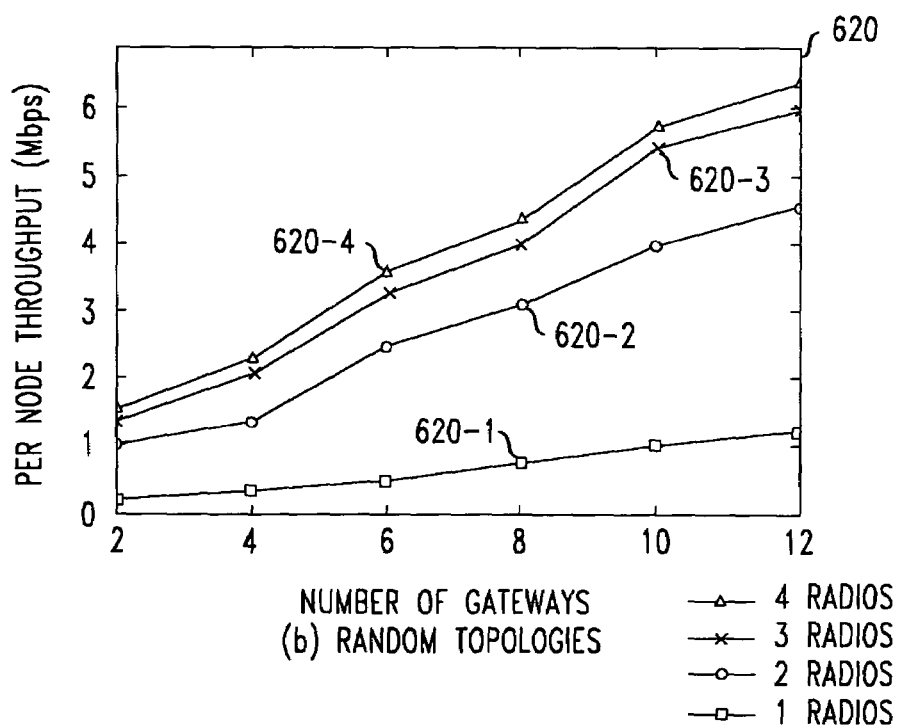

In this evaluation, we varied the number of radios and gateway nodes in the 60-node grid topology and random topologies to study their impact on the network throughput. The number of channels was fixed at 12 and each data point for random topologies is averaged over the 9 topologies. FIGS. 6A and 6B show evaluation results, in graphical form, of the RCL Methodology of the present invention, for four WMN configurations having varying a number of radios. In particular, graph 610 shows graphical results for a grid topology for four different radio configurations (610-1, 610-2, 610-3 and 610-4, respectively), and graph 620 shows graphical results for random topologies for four radio configurations (620-1, 620-2, 620-3 and 620-4, respectively). As shown in FIGS. 6A and 6B, the results of graph 610 and graph 620 are each shown in terms of "per node throughput (Mbps)" vs. "number of gateways".

As can be seen from evaluation results of FIGS. 6A and 6B, the RCL Methodology of the present invention is able to exploit the increase in the number of radios and gateways to obtain a solution with improved per-node throughput. We see that the per-node throughput increases significantly from the one radio case (i.e., 610-1 and 620-1) to the two radio case (i.e., 610-2 and 620-2), much more than the percentage increase from the 2 radio to 3 radio (i.e., 610-3 and 620-3) and from 3 radio to 4 radio (i.e., 610-4 and 620-4) case. For example, in graph 610 for the grid topology with 12 gateways the throughput corresponding to variable radio cases (i.e., 1 through 4 radios) is 0.53, 3.8, 5.5 and 5.9 Mbps, respectively. Similarly, in graph 620 for the random topologies the throughput corresponding to the variable radio cases is 1.0, 3.8, 5.0 and 5.4 Mbps, respectively. With one more radio, we see a 620% and 280% increase in per-node throughput for the grid topology and random topologies respectively, which justifies the use of a small number of radios.

8.3 Performance Comparison with Uipiper Bound and Worst Case Bound

In order to compute the worst case bound we need the optimal value for λ, the computation of which remains intractable in our setting. As such, we used an upper bound λ* on this value provided by the linear program LP 1 (as set forth hereinabove). Therefore, an estimate on the worst case throughput of the RCL Methodology of the present invention is $$\frac{\lambda^*}{w} l(v)$$

where $$W = c(q) \frac{K}{I}$$

Figure 7A:
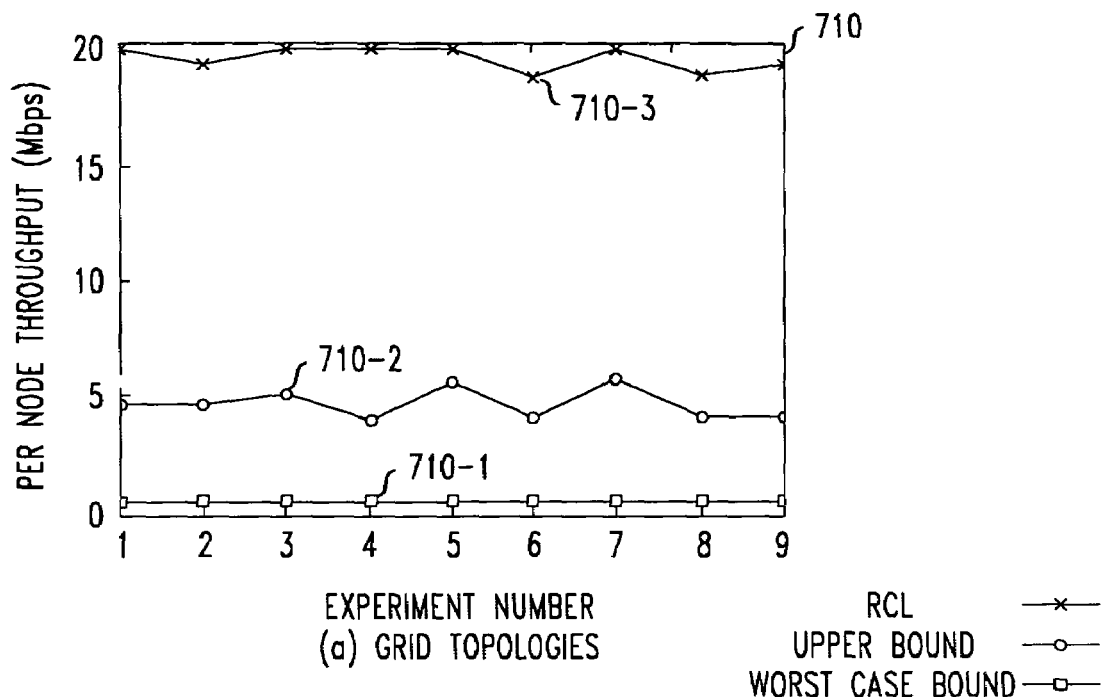
FIGS. 7A and 7B show evaluation results for a performance comparison between the RCL Methodology of the present invention with an upper bound and worst case bound.
Figure 7B:
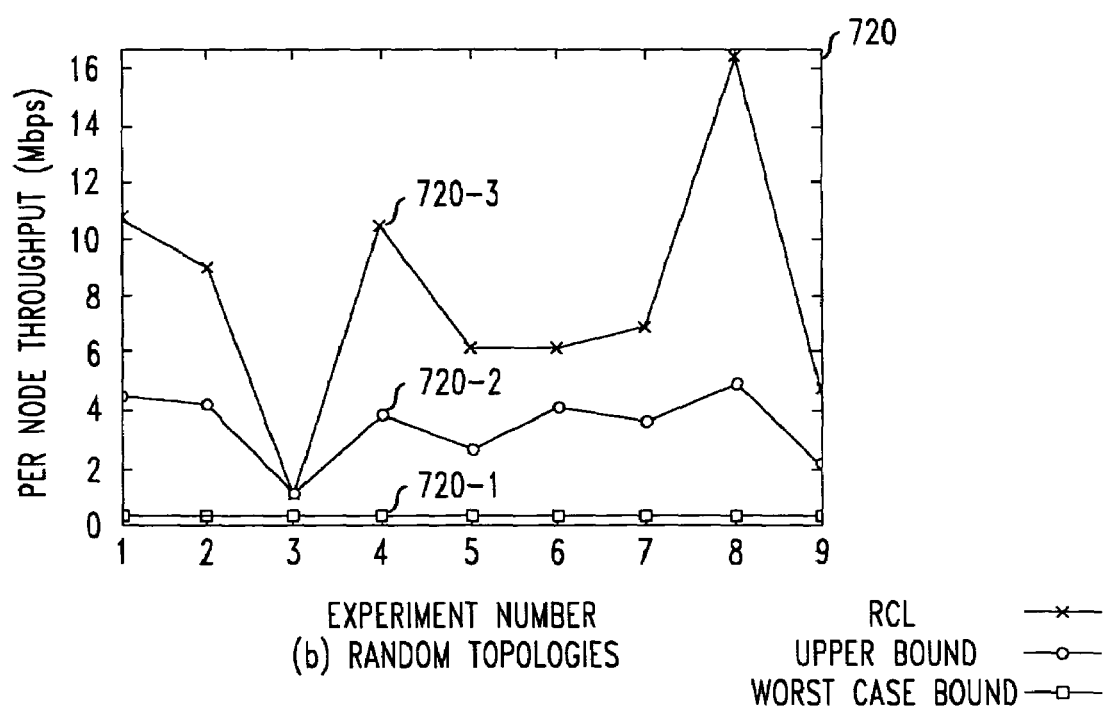

(for any v ∈ V) We compare this value and λ* with the actual throughput that the RCL Methodology is able to achieve. More particularly, FIGS. 7A and 7B shows evaluation results, in graphical form, for a performance comparison between the RCL Methodology of the present invention with an upper bound and worst case bound. Graph 710 shows graphical results for a grid topology for a performance comparison between the RCL Methodology, the upper bound and the lower bound (710-3, 710-2, 710-1, respectively), and graph 720 shows graphical results for random topologies for a performance comparison between the RCL Methodology, the upper bound and the lower bound (720-3, 720-2, 720-1, respectively). As shown in FIGS. 7A and 7B, the results of graph 710 and graph 720 are each shown in terms of "per node throughput (Mbps)" vs. "experiment number". In this evaluation, 9 different grid and random topologies were employed, each with 60 nodes (20 nodes having traffic demands and 8 gateway nodes). Each node has 3 radios with a fixed the number of channels at 12. As seen form the results, the RCL Methodology's average case performance is around 5.3 to 7.9 and 8.3 to 28.7 times better than the worst case estimated performance for the grid and random topologies. The RCL Methodology is at most 4.0 and 2.4 times worse than the upper bound for the grid and random topologies.

The RCL Methodology of the present invention provides a constant factor approximation technique for the joint channel assignment, routing and scheduling problem that models the interference and fairness constraints and is able to account for the number of radios at each of the wireless nodes of a WMN. The RCL Methodology establishes matching necessary and sufficient conditions under which an interference free link communication schedule can be obtained and computed. The RCL Methodology is a novel flow transformation technique that can efficiently assign channels to node radios in a WMN while ensuring that maximum data can be transmitted on specified traffic routes.

The foregoing merely illustrates the principles of the invention. It will thus be appreciated that those skilled in the art will be able to devise various arrangements which, although not explicitly described or shown herein, embody the principles of the invention and are within its spirit and scope. For example, one skilled in the art, in light of the descriptions of the various embodiments herein, will recognize that the principles of the present invention may be utilized in widely disparate fields and applications. All examples and conditional language recited herein are intended expressly to be only for pedagogical purposes to aid the reader in understanding the principles of the invention and are to be construed as being without limitation to such specifically recited examples and conditions. Moreover, all statements herein reciting aspects and embodiments of the invention, as well as specific examples thereof, are intended to encompass functional equivalents thereof.

Further, the invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The invention can also be embodied in the form of program code, for example, in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

We claim:

1. method for making joint channel and routing assignments in a wireless mesh network, said wireless mesh network having a plurality of nodes, a plurality of channels and a plurality of radios, said method comprising the steps of:
   generating, by a network element, a flow graph of said wireless mesh network as function of said plurality of nodes, said plurality of channels and said plurality of radios;
   identifying, as a function of a throughput of said wireless mesh network and a set of fairness constraints, a first routing of said plurality of channels and said plurality of radios from a flow from said flow graph;
   a first adjusting of said flow to ensure a feasible channel assignment among said plurality of channels in said first routing, said first adjusting resulting in a second routing of said plurality of channels and said plurality of radios;
   a second adjusting of said flow as a function of a maximum interference level across each channel of said plurality of channels in said second routing;
   scaling said second adjusted flow to eliminate all interference over said plurality of channels;
   generating an interference free link schedule from said scaled, second adjusted flow; and
   sending said interference free link schedule said first routing, and said second routing to said plurality of nodes across said wireless mesh network for exchanging communications between said plurality of nodes.

2. The method claim 1, wherein said identifying step further comprises the steps of:
   applying a linear program to maximize said throughput subject to said fairness constraints, said linear program being formulated as a function of said flow graph.

3. The method of claim 2, wherein said scaling step results in a feasible routing and channel assignment satisfying a sufficient condition for an interference free edge communication schedule.

4. The method of claim 3, wherein the scaling step employs a scaling factor L given by $\zeta = \max\{1, \max_{1 \le i \le K} \text{Int}(i)\}$ where i denotes a channel, K denotes a total number of channels, and Int(i) is the interference of channel i".

5. The method of claim 2, wherein said linear program is applied subject to at least one flow constraint, at least one node radio constraint and at least one link congestion constraint.

6. The method of claim 5, wherein said at least one flow constraint is given by:

$$\sum_{(u,v) \in E^H} f((u,v)) = \sum_{(v,u) \in E^H} f((v,u)), \forall v \in V^H - \{s, t\}$$

where H denotes a flow graph, $V^H$ denotes a set of nodes in H, $E^H$ denotes a set of edges in H, f(e) denotes the flow on an edge e of H, s denotes a source node, t denotes a sink node, u and v denote different nodes.

7. The method of claim 6, wherein said at least one radio constraint is given by:

$$\sum_{1 \le i \le K} \sum_{e=(u,v) \in E} \frac{f(e(i))}{c(e)} + \sum_{1 \le i \le K} \sum_{e=(v,u) \in E} \frac{f(e(i))}{c(e)} \le I(v)$$

where u and v denote different nodes, i denotes a channel, K denotes a total number of channels, e denotes an edge, and E denotes a set of edges,
wherein c(e) is the maximum rate of communication for edge e=(u,v) for one hop on a single channel, and I(v) represents the number of radios at node v.

8. The method of claim 7, wherein said at least one link congestion constraint is given by:

$$\frac{f(e(i))}{c(e)} + \sum_{e' \in I(e)} \frac{f(e'(i))}{c(e')} \le c(q), \forall e \in E, 1 \le i \le K$$

where c(q) denotes a constant value depending solely on the value of q, and q is an interference range divided by a transmission range.

9. The method of claim 5, wherein said linear program is given by:

$$\min \sum_{1 \le i \le K} \sum_{e = f(v,u) \in E} \frac{f(e(i))}{c(e)}.$$

where u and v denote different nodes, i denotes a channel, K denotes a total number of channels, e denotes an edge, and E denotes a set of edges.

10. The method of claim 1, wherein said first adjusting step further comprises the step of:
assigning particular ones of said channels to particular one of said radios, said assigning performed to minimize interference for said particular ones of said channels without a change in said second routing of said plurality of channels and said plurality of radios.

11. The method of claim 1, wherein said generating said interference free schedule link schedule utilizes a plurality of edge flows corresponding to said flow.

12. The method of claim 1, wherein said wireless mesh network is an infrastructure wireless mesh network.

13. The method of claim 12, wherein at least one radio of said plurality of radios is IEEE 802.11 compliant.

14. The method of claim 13, wherein at least one node of said plurality of nodes is a gateway router.

15. The method of claim 14, wherein said infrastructure wireless mesh network provides network connectivity between a plurality of mobile clients and the Internet.

16. The method of claim 15, wherein said plurality of channels are orthogonal channels.

17. The method of claim 1, wherein each radio of said plurality of radio operates on a particular one channel of said plurality of channels.

18. An article of manufacture comprising a machine-readable medium storing one or more programs for use in making joint channel and routing assignments in a wireless mesh network, said wireless mesh network having a plurality of nodes, a plurality of channels and a plurality of radios, said one or more programs when executed in a processor performing the steps of:
generating, by a network element, a flow graph of said wireless mesh network as function of said plurality of nodes, said plurality of channels and said plurality of radios;
identifying, as a function of a throughput of said wireless mesh network and a set of fairness constraints,
a first routing of said plurality of channels and said plurality of radios from a flow from said flow graph; a first adjusting of said flow to ensure a feasible channel assignment among said plurality of channels in said first routing, said first adjusting resulting in a second routing of said plurality of channels and said plurality of radios;
a second adjusting of said flow as a function of a maximum interference level across each channel of said plurality of channels in said second routing;
scaling said second adjusted flow to eliminate all interference over said plurality of channels;
generating an interference free link schedule from said scaled, second adjusted flow; and
sending said interference free link schedule, said first routing, and said second routing to said plurality of nodes across said wireless mesh network for exchanging communications between said plurality of nodes.

19. The article of manufacture claim 18, wherein said identifying step further comprises:
applying a linear program to maximize said throughput subject to said fairness constraints, said linear program being formulated as a function of said flow graph.

20. The article of manufacture claim 19, wherein said wireless mesh network is an infrastructure wireless mesh network which provides network connectivity between a plurality of mobile clients and the Internet.

21. A method for making channel and routing assignments in a wireless mesh network comprising:
determining, by a network element, a set of possible data paths in a wireless mesh network based on information of a plurality of nodes, a plurality of channels, and a plurality of radios in the wireless mesh network;
identifying first routing assignments of the plurality of channels and plurality of radios based on a possible data path from the set of possible data paths;

adjusting the possible data path, based on channel assignment feasibility and maximum interference among the plurality of channels, to determine channel assignments and second routing assignments;

scaling the adjusted possible data path to minimize interference over the plurality of channels;

generating a link schedule for the wireless mesh network based on the adjusted possible data path and the scaled possible data path; and sending, by the network element, the channel assignments, the first and the second routing assignments, and the link schedule to the plurality of nodes.

22. The method of claim 21, wherein the identifying is based on (i) a function of throughput of the network and (ii) fairness constraints.

23. The method of claim 21, further comprising:
repeating the identifying, adjusting, scaling, and generating steps for each possible data path in the set of possible data paths.

24. The method of claim 21, wherein the network element is one of a machine and a computer.

25. The method of claim 21, wherein the network element is a node.

26. The method of claim 25, further comprising:
relaying, by the node, traffic to at least one of the plurality of nodes based on the channel assignments, the first and the second routing assignments, and the link schedule.

27. The method of claim 21, wherein the sending is performed via one of a transmission medium and electromagnetic radiation.

* * * * *

UNITED STATES PATENT AND TRADEMARK OFFICE
CERTIFICATE OF CORRECTION

PATENT NO. : 7,643,469 B2  Page 1 of 1
APPLICATION NO. : 11/325060
DATED : January 5, 2010
INVENTOR(S) : Alicherry et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1038 days.

Signed and Sealed this

Twenty-first Day of December, 2010

David J. Kappos
*Director of the United States Patent and Trademark Office*